(12) United States Patent
Ando et al.

(10) Patent No.: US 7,609,938 B2
(45) Date of Patent: Oct. 27, 2009

(54) RECORDING AND REPRODUCING APPARATUS, AND EDITING METHOD

(75) Inventors: Hideki Ando, Kanagawa (JP); Kazuo Ido, Kanagawa (JP); Noboru Oya, Kanagawa (JP)

(73) Assignee: Sony Corporation, Tokyo (JP)

( * ) Notice: Subject to any disclaimer, the term of this patent is extended or adjusted under 35 U.S.C. 154(b) by 794 days.

(21) Appl. No.: 11/243,400

(22) Filed: Oct. 4, 2005

(65) Prior Publication Data

US 2006/0072901 A1    Apr. 6, 2006

(30) Foreign Application Priority Data

Oct. 6, 2004    (JP) .............................. 2004-294073

(51) Int. Cl.
*H04N 5/93*    (2006.01)
*H04N 5/00*    (2006.01)

(52) U.S. Cl. ......................................... 386/52; 386/125

(58) Field of Classification Search .................. 386/52, 386/55, 104, 105, 106, 125, 124
See application file for complete search history.

(56) References Cited

U.S. PATENT DOCUMENTS

2006/0280479 A1* 12/2006 Mita et al. ..................... 386/96
2009/0028528 A1*  1/2009 Harradine et al. ........... 386/117

FOREIGN PATENT DOCUMENTS

| JP | 10 172268 | 6/1998 |
| JP | 2000 41245 | 2/2000 |
| JP | 2001 103428 | 4/2001 |
| JP | 2001 238208 | 8/2001 |
| WO | WO 2004 021701 | 3/2004 |

* cited by examiner

*Primary Examiner*—Robert Chevalier
(74) *Attorney, Agent, or Firm*—Frommer Lawrence & Haug LLP; William S. Frommer; Thomas F. Presson

(57) ABSTRACT

The present invention provides a recording and reproducing apparatus for recording and reproducing any of video data, audio data, and realtime metadata corresponding to any of the video data and the audio data by use of a random-accessible recording medium. The recording and reproducing apparatus executes destructive editing on any of video data, audio data, and realtime metadata corresponding to any of the video data and the audio data recorded on the random-accessible recording medium on the recording medium.

14 Claims, 19 Drawing Sheets

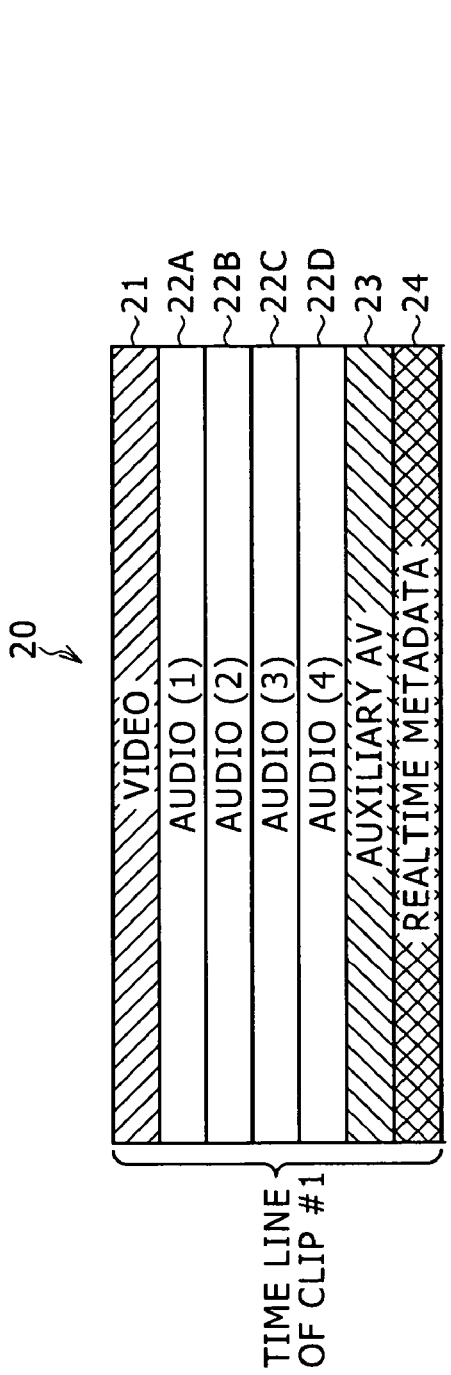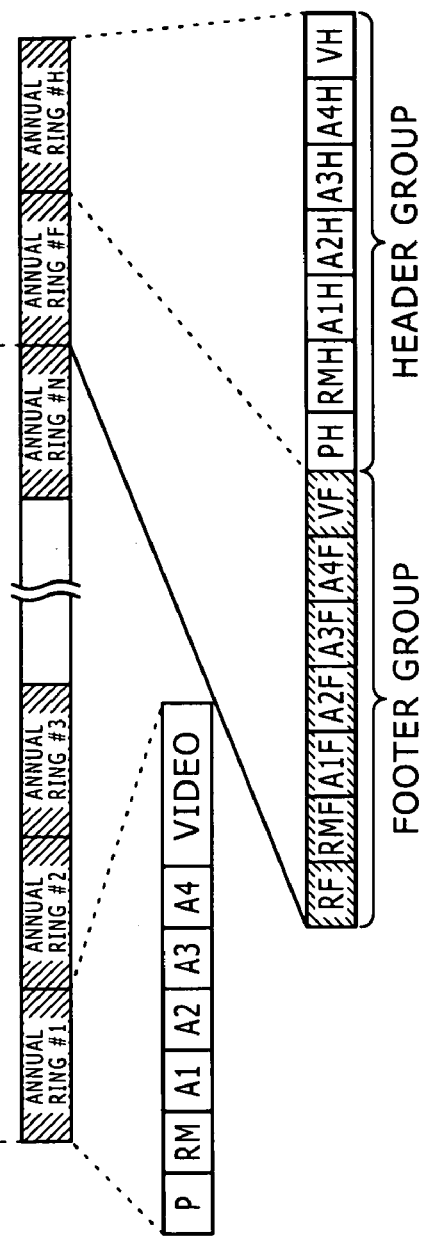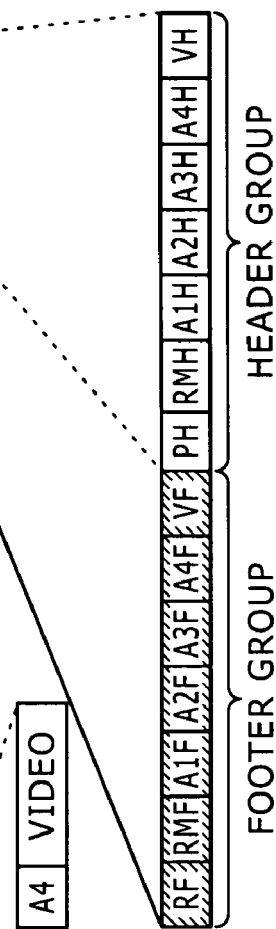

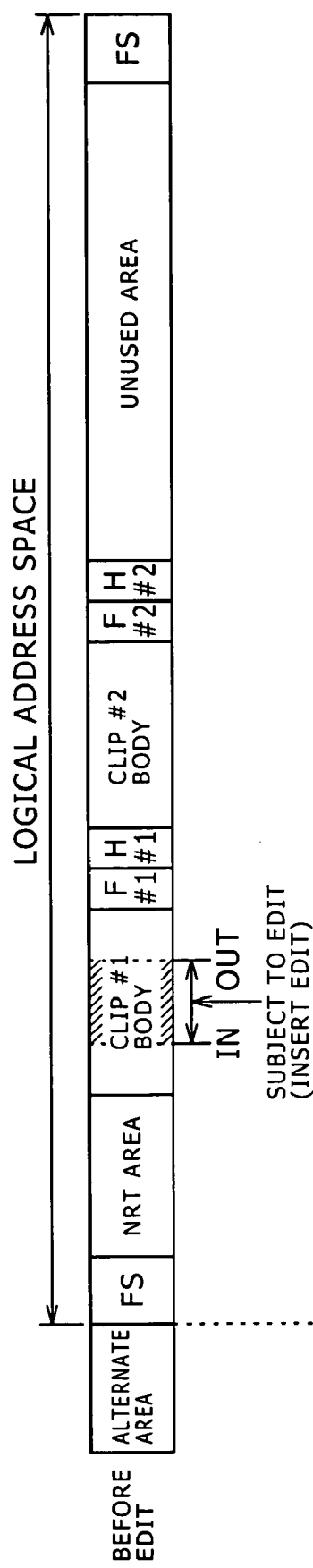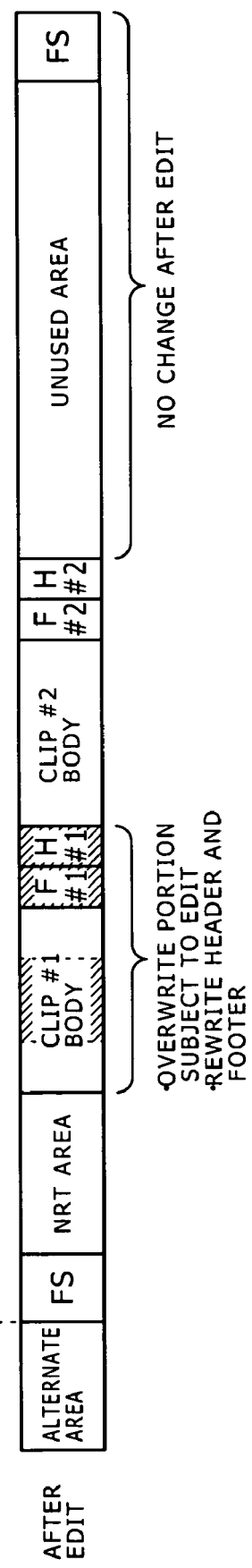

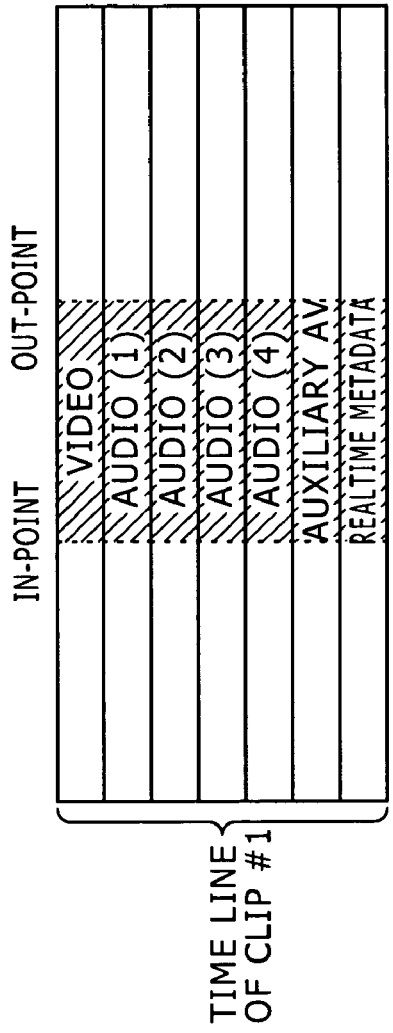
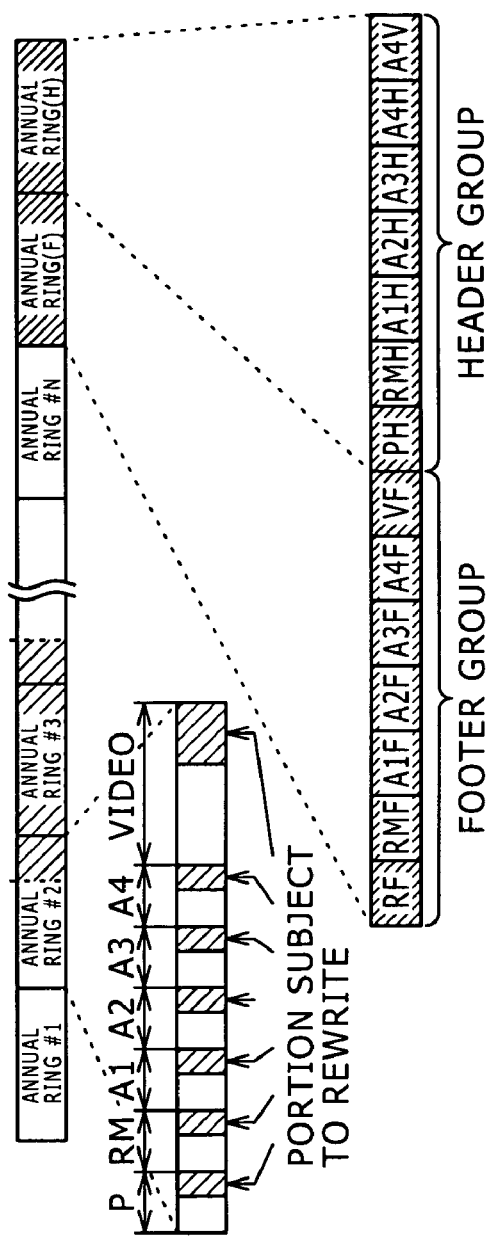
FIG. 6A
FIG. 6B
FIG. 6C
FIG. 6D

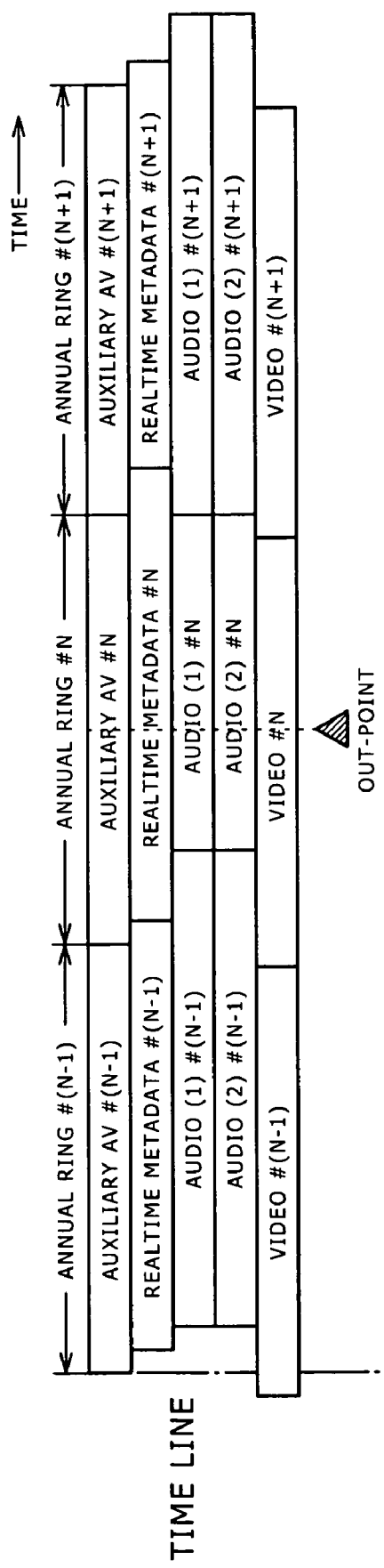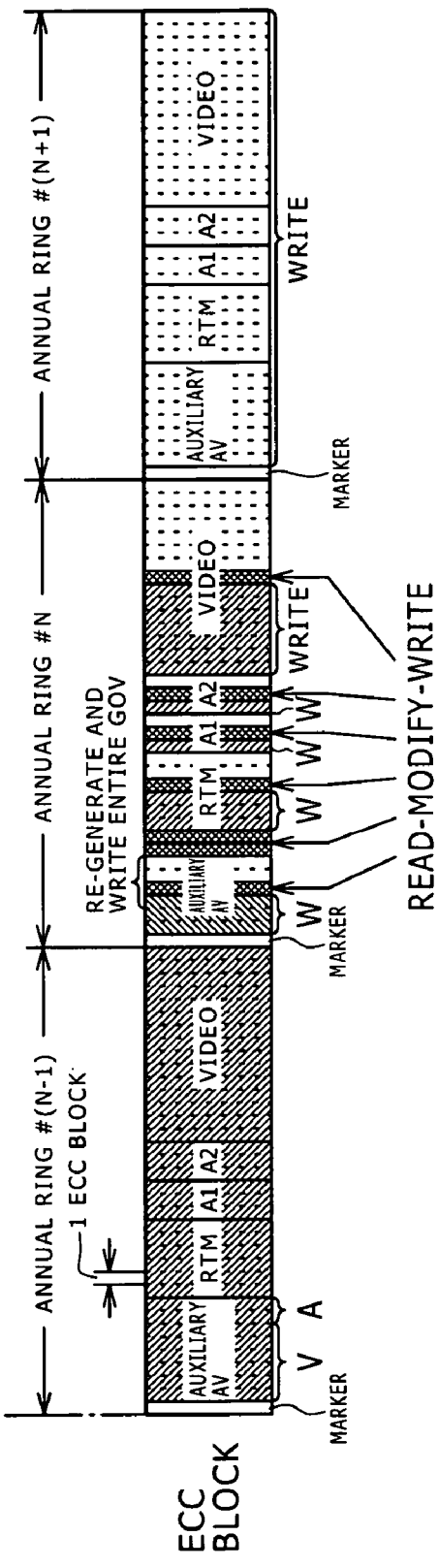

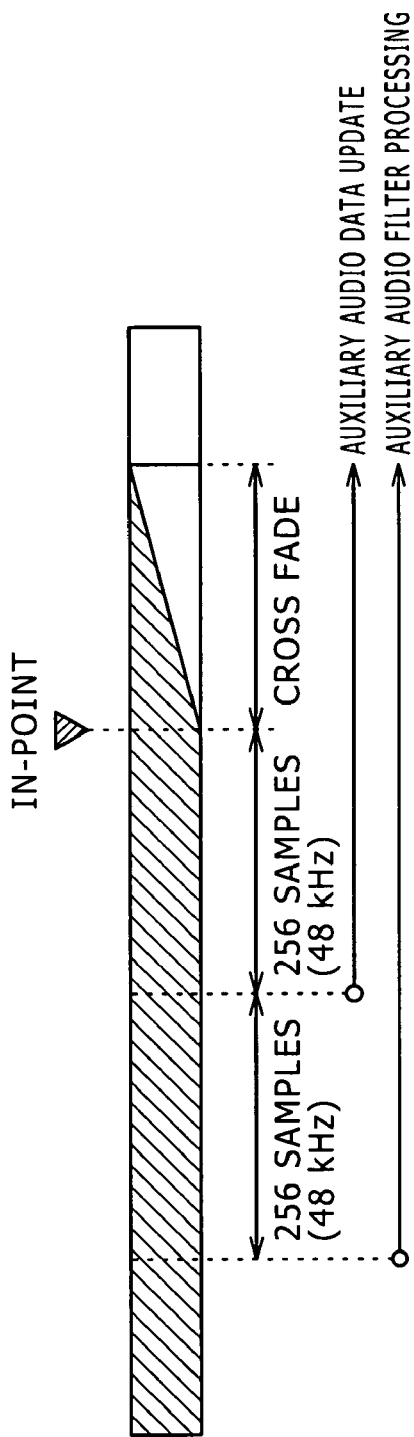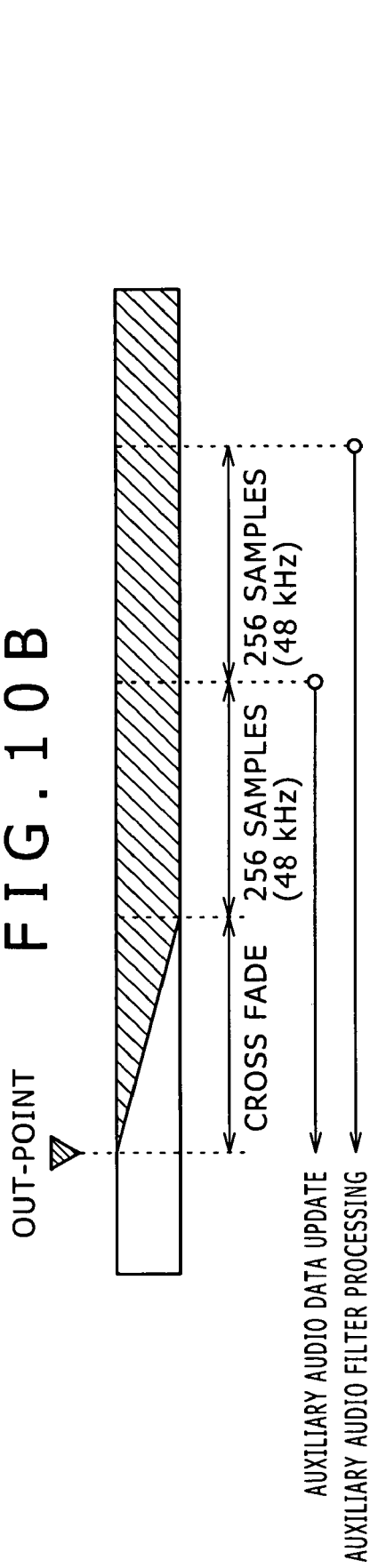

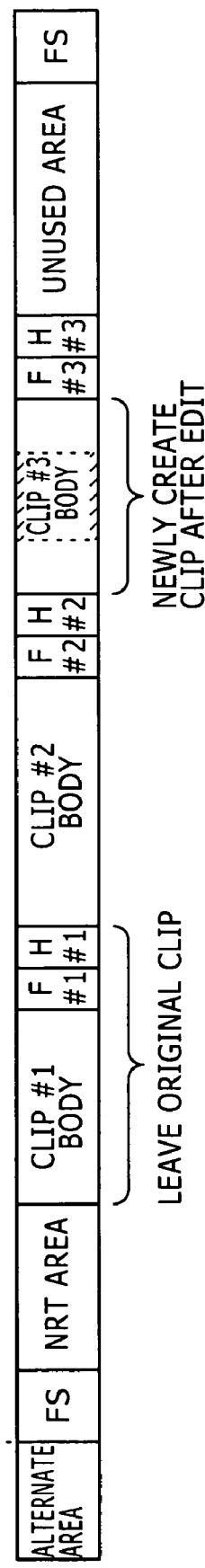

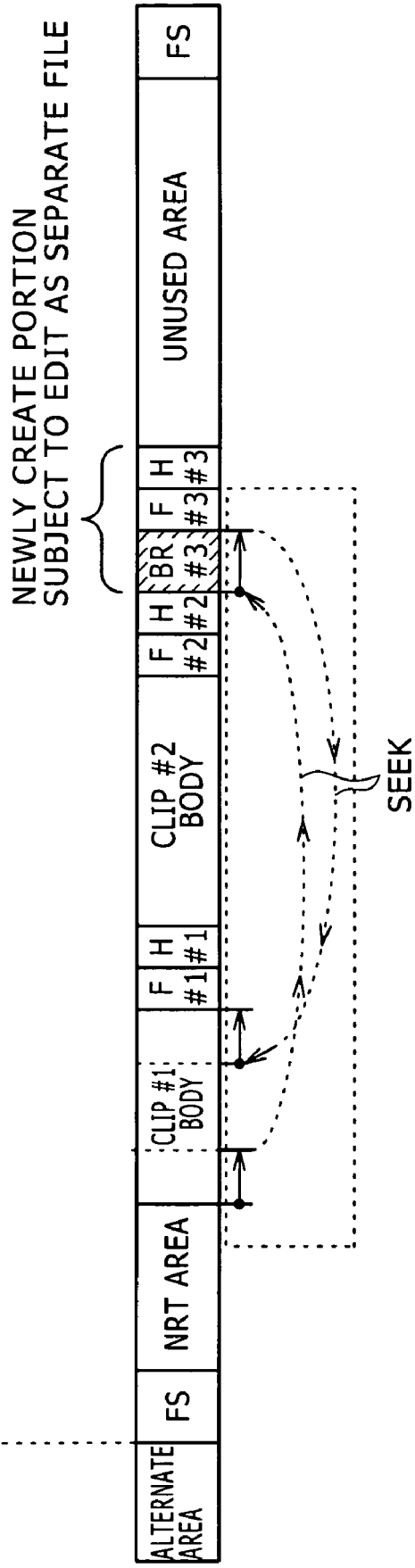

RECORDING AND REPRODUCING APPARATUS, AND EDITING METHOD

CROSS REFERENCES TO RELATED APPLICATIONS

The present invention contains subject matter related to Japanese Patent Application JP 2004-294073 filed in the Japanese Patent Office on Oct. 6, 2004, the entire contents of which being incorporated herein by reference.

BACKGROUND OF THE INVENTION

The present invention relates to a recording and reproducing apparatus and an editing method for editing AV (Audio/Video) data and realtime metadata corresponding thereto by use of random-accessible recording media.

Especially, in professional scenes such as broadcasting stations, digital audio data and/or digital video data captured by video cameras and recorded to recording media are later edited as required before being actually used. Along with digital audio data and/or digital video data, realtime metadata that provides information thereabout is also recorded and used for editing. In what follows, these digital audio data and/or digital video data and realtime metadata will also be generically referred to as AV (Audio/Video) data. In one session of editing, desired video cuts are extracted from AV data reproduced from recording media, the start point (or the in-point) and the end point (or the out-point) of each extracted video cut are marked, and a plurality of video cuts are connected on the basis of the marked in-point and out-point, thereby providing a continuously connected video including desired video cuts.

In related-art technologies, recording media of serial access type such as magnetic tapes have been used for AV data recording and reproduction. Recently, random-accessible recording media such as optical disc, hard disc, and semiconductor memory have come to use for AV data recording and reproduction in many cases. Random-accessible recording media allow nonlinear editing in which an editing session may be completed on a same recording medium. In what follows, random-accessible recording media are referred to as nonlinear recording media. An editing apparatus for executing nonlinear editing is disclosed in Japanese Patent Laid-open No. 2001-319463

Generally, nonlinear recording media are very high in access speed as compared with serial-access recording media such as magnetic tape. Especially, hard discs are high in access speed and, at the same time, high in recording capacity, being capable of recording a huge amount of AV data. Optical discs and semiconductor memories having storage capacities large enough for recording plural pieces of AV data have recently emerged on the market. In these nonlinear recording media, the reproduction of the AV data between an in-point and an out-point for use in editing and the recording of the edited AV data may be executed concurrently with ease on one same recording medium and the edited AV data may be recorded to the same recording medium at another recording position with ease. Therefore, with nonlinear recording media, nondestructive editing in which an editing operation is executed with original AV data left remaining is practiced.

The following overviews related-art editing methods based on nonlinear recording medium. The related-art editing based on nonlinear recording medium is supported by one of the following two methods. In the first method, an entire edit result including a portion not subject to editing is written to a free space on a recording medium, as shown in FIGS. 18A and 18B for example. In the second method, only the AV data necessary for editing is written to a free space on a recording medium and control data is generated for giving an instruction for the continuous reproduction of this AV data and an area not subject to editing, as shown in FIGS. 19A and 19B for example.

As shown in FIGS. 18A and 19A for example, clip #1 and clip #2 are recorded in a logical space that is controlled by a file system FS by use of logical addresses and the remaining area in the logical space is handled as an unused area. It should be noted that a clip is a set of AV data; one clip is composed of the AV data generated between the starting of a video camera and the ending thereof, for example. A video clip includes digital video data taken by a video camera for example and digital audio data picked up at the same time as the video taking. Also, a clip may include metadata generated at the time of taking.

As shown in FIGS. 18A and 19A for example, an in-point and an out-point are set to clip #1. It is assumed that an insert editing is executed to insert a video cut into an interval subject to editing defined by these in-point and out-point.

In the first method, entire clip #1 inserted with a video cut between the in-point and the out-point of clip #1 is written to an unused area on the recording medium as clip #3 as shown in FIG. 18B. The original clip #1 is left at the original position in an unedited state. According to the first method, if there is an unused area large enough for editing, the results of editing may be continuously arranged in that unused area. In this example, no seek operation is executed at the in-point and the out-point, so that it is easy to guarantee realtime reproduction.

In the second method, only the data necessary for editing, namely, a video cut inserted between the in-point and the out-point is written to the unused area as shown in FIG. 19B (where this cut is indicated as video cut BR #3) and control data is generated to give an instruction for continuously reproducing a portion other than that outside the portion defined by the in-point and the out-point of clip #1 and video cut BR #3. The control data is recorded on the recorded medium as required. The second method is advantageous in that the amount of data to be recorded as a result of editing may only be minimal.

SUMMARY OF THE INVENTION

The above-mentioned first method presents a problem that, if the unused area is scattered, the realtime reproduction of the results of editing written thereto becomes difficult.

With nonlinear recording media, address control is executed by a file system, in which the file system appropriately allocates the unused area on each recording medium to data to be recorded. Therefore, the repetition of data recording, deleting, and moving operations for example disrupts the continuity of physical addresses relative to logical addresses, resulting in the segmentation of the unused area. If clip #3, which is a result of editing, is written to segmented unused areas, discontinuity occurs in physical address while continuity in local address is maintained, thereby frequently causing seek operations at discontinuous physical address points at the time of data reproduction, resulting in difficult realtime data reproduction.

The above-mentioned first method also presents a problem that, in writing a result of editing to the unused area, a portion in which data remains unchanged after editing (in the example shown in FIGS. 18A and 18B, an interval between the start of clip #1 and the in-point and an interval between the out-point and the end of clip #1) is also written to the unused area, thereby occupying a lot of the recording capacity of each recording medium.

In an extreme example, if a very short portion of a very long clip is rewritten by editing, an unused area that is large enough for writing the entire clip in is required to execute an editing operation, thereby presenting inconvenience in editing.

The above-mentioned first method presents another problem that the writing of a result of editing along with the portion left unchanged by editing results in the writing of lots of data, thereby increasing the time necessary for data writing.

The above-mentioned second method requires a seek operation in reproducing a result of editing, thereby making it difficult to guarantee the realtime reproduction of editing results.

In reproducing the result of the editing made in the second method, the body of clip #1 is reproduced starting from the beginning thereof up to the in-point, at which a seek is made to the beginning of video clip BR #3 recorded to the unused area, as shown in FIG. 19B for example. Next, when the reproduction has been made up to the end of video clip BR #3, a seek is made again, starting reproduction from the out-point of the body of clip #1. Thus, the second method requires at least two seek operations for reproducing one editing result.

Further, if there are many clips between the body of clip #1 defined by in-point and out-point and the unused area, the seek distance gets longer to require a long time, thereby making realtime reproduction more difficult. In addition, if there are two or more pairs of in-points and out-points in one clip, resulted from a complicated editing session for example, it is difficult to make realtime reproduction.

Besides, the above-mentioned second method also occupies the unused area if minimal in editing, so that the execution of editing becomes impracticable if the unused area is running short.

Consequently, it is desirable to provide a recording and reproducing apparatus and an editing method that prevent the consumption of the capacity of recording media from increasing in data editing and easily guarantee the realtime reproduction of editing results.

According to an embodiment of the present invention, there is provided a recording and reproducing apparatus for recording and reproducing any of video data, audio data, and realtime metadata corresponding to any of the video data and the audio data by use of a random-accessible recording medium. The recording and reproducing apparatus executes destructive editing on any of video data, audio data, and realtime metadata corresponding to any of the video data and the audio data recorded on the recording medium on the random-accessible recording medium.

According to an embodiment of the present invention, there is provided an editing method for editing any of video data, audio data, and realtime metadata corresponding any of the video data and the audio data recorded on a random-accessible recording medium. Destructive editing is executed on any of the video data, the audio data, and the realtime metadata corresponding to any of the video data and the audio data recorded on the recording medium on the random-accessible recording medium.

As described above, the present invention executes destructive editing on video data, audio data, and/or realtime metadata corresponding to these video and audio data recorded on random-accessible recording medium on the recording medium, so that the present invention requires no free space on the recording medium in editing a minimum amount of data subject to rewriting, thereby reducing a time necessary for the editing operation. In addition, in the present invention, data subject to editing is written over by edit data on the recording medium, thereby preventing a seek operation from getting longer than before editing also in reproducing editing results.

The present invention is advantageous that no free space on the recording medium is required for the execution of editing because the destructive editing is executed on a nonlinear recording medium in which base data is written over by edit data.

The present invention is further advantageous that the data subject to rewriting is minimized by the destructive editing, thereby minimizing a time required for rewriting in edit operation.

The present invention is still further advantageous that base data is written over by edit data in the destructive editing, the reproduction of edit results requires no longer seek time than before the editing. This, in turn, may allow more sophisticated editing operations.

The present invention is yet further advantageous that the integrity of all data forming each clip is maintained for set editing points, so that the correlation between the main-line AV data and the auxiliary AV data may be maintained, thereby allowing, also for editing results, special reproducing operations by use of the auxiliary AV data and the offline editing operations based on the auxiliary AV data.

The present invention is also advantageous that, if signal processing extends outside a range subject to editing, a range of data rewriting is obtained by considering the signal processing's extending outside the editing range, so that the data in the proximity of in-point and out-point holds a proper status at the execution of editing, resulting in the smooth reproduction of editing results.

In addition, the present invention is advantageous that a data rewrite range is obtained for every recording unit of each recording medium, thereby allowing the execution of editing on a block device.

BRIEF DESCRIPTION OF THE DRAWINGS

FIGS. 2A, 2B, 2C, and 2D are schematic diagrams illustrating a annual ring structure;

FIGS. 5A and 5B are schematic diagrams illustrating destructive editing according to the invention;

FIGS. 6A, 6B, 6C, and 6D are schematic diagrams illustrating an example of a base data rewriting range in the destructive editing as corresponding to the annual ring structure;

FIGS. 8A and 8B are schematic diagrams illustrating another example of a write range with blocks taken into consideration;

FIGS. 10A and 10B are schematic diagrams illustrating a rewrite range at the time of cross fading of audio data in auxiliary AV data;

FIGS. 18A and 18B are schematic diagrams illustrating a related-art editing method based on nonlinear recording media; and FIGS. 19A and 19B are schematic diagrams illustrating the related-art editing method shown in FIGS. 18A and 19B.

DETAILED DESCRIPTION OF THE PREFERRED EMBODIMENTS

Figure 1:
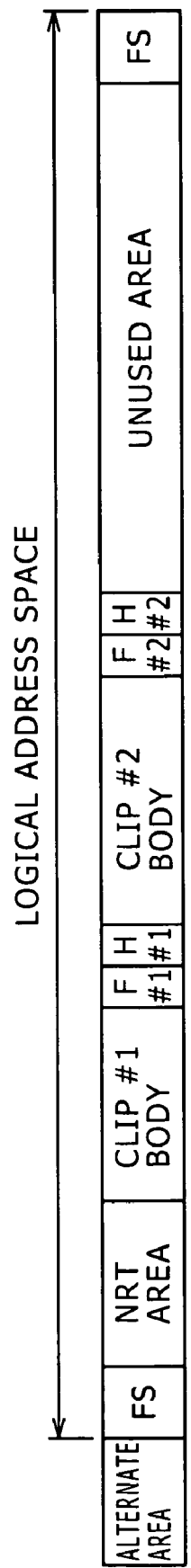
FIG. 1 is a schematic diagram illustrating an exemplary data arrangement on a nonlinear recording medium.

The following describes embodiments of the invention with reference to accompanying drawings. First, for ease of understanding, a recording medium and a recording and reproducing apparatus applicable to an embodiment of the present invention will be described. FIG. 1 shows an exemplary data arrangement on a disc recording medium. The data arrangement shown in FIG. 1 as one example is a general data arrangement on random accessible disc recording media such as recordable optical discs and hard discs. This data arrangement may also be applied to non-disc recording media such as semiconductor memories. A logical address space shown is an area in which given data may be recorded or reproduced.

The logical address space starts and ends with a file system FS. Given data is recorded in the logical address space in a predetermined format generally called a file. The data recorded on each recording medium is controlled basically on a file basis. File control information is recorded in the file system FS. A file system layer of a system control block (to be described later) of the recording and reproducing apparatus allows the control of various types of data on one recording medium by referencing and manipulating the information in the file system FS.

Outside the logical address space, an alternate area is arranged. The alternate area provides an area that is used when the recording medium is partially and physically becomes inaccessible due to a defect. For example, if a defective area is recognized in accessing (especially in recording to) a recording medium, alternation processing is executed in general, by which the address of the defective area is moved into the alternate area.

The use of the alternate area is stored in a predetermined area as a defect list for use by lower layers of a drive control block and a system control block of the recording and reproducing apparatus. In the lower layers of the drive control block and the system control block to be described later, the defect list is referenced at accessing the recording medium, thereby making it to access an appropriate area even while alternation processing is being executed. This scheme in the alternate area allows higher applications to record and reproduce data on the recording medium without considering the presence or position of a defective recording area on the recording medium.

In the case of disc recording media, the alternate area is often arranged on the inner circumference side or the outer circumference side of the disc. If disc rotational control is executed by zone control in which rotational speed is changed stepwise in radial direction of the disc, an alternate area may be arranged for each zone. If the recording medium is not of disc type, such as a semiconductor memory, the alternate area of often arranged on the side of lowest physical address or highest physical address.

With applications in which AV data are handled, a set of data that provides a unit requiring continuous synchronous reproduction, namely, reproduction guaranteed in realtime reproduction, is referred to as a clip. For example, a set of data captured from the beginning to the end of video taking with a video camera is handled as one clip. What constitutes a clip is a one or more files. In the present invention, one clip is composed of two or more files. Details of the clip will be described later.

In the logical address space, an NRT (Non Real Time) area in which a given file other than a clip may be recorded is arranged to the start side of this space, followed by clips sequentially. The clips are arranged outside the defect position if any of an optical disc 100, thereby preventing the above-mentioned alternation processing from occurring. Each clip is attached with a header (H) and a footer (F). In this example, a header and a footer are arranged together on the end side of each clip.

Any area in which no data is recorded or any area in which data have been recorded but are not required is controlled by the file system FS as an unused area in the logical address space. A recording area is allocated to a file newly recorded to the recording medium on the basis of the unused area. The control information of that file is added to the file system FS.

If a recordable optical disc is used as a recording medium, the present invention records clips to the disc in an annual ring structure. The following describes the annual ring structure with reference to FIGS. 2A to 3. FIG. 2A shows an example in which one clip 20 is shown time lines. In this example, the clip 20 is made up of video data 21, audio data 22A to 22D, auxiliary AV data 23, and realtime metadata 24, namely, 7 files.

The video data 21 is video data obtained by data-compressing baseband video data with a high bit rate. For a data compression algorithm, MPEG2 (Moving Picture Experts Group 2) is used, for example. Audio data 22A, 22B, 22C, and 22D are baseband audio data, each being of 2 channels. In addition, audio data 22A, 22B, 22C, and 22D may be audio data obtained by a data-compressing baseband audio data with a high bit rate. The video data 21 and the audio data 22A to 22D are the data that are subject to actual broadcasting and editing and are referred to as main-line data.

The auxiliary AV data 23 is obtained by data-compressing baseband video data and audio data with a lower bit rate than the main-line video data and audio data and multiplexing the compressed video data and audio data. For a data compression algorithm, MPEG4 is used for example, in which the main-line AV data is compressed such that the bit rate is dropped to several M bps (Mega bits per second) to generate the auxiliary AV data 23. The auxiliary AV data 23 is used in proxy for main-line data at determining edit points for example; therefore, the auxiliary AV data 23 is referred also as proxy data. It should be noted that, in the present embodiment, the number of channels of the audio data in the auxiliary data is fixed to 8.

Metadata is higher data for given data, functioning as an index indicative of the contents of various kinds of data. Metadata is of two types; realtime metadata 24 that is generated along the time sequence of the above-mentioned main-line AV data and nonrealtime metadata that is generated for a predetermined interval, such as each scene in the main-line AV data. The nonrealtime metadata is recorded to the NRT area described with reference to FIG. 1, for example.

The clip 20 is divided by predetermined reproduction time to be recorded on an optical disc in the form of an annual ring structure, as shown in FIG. 2B for example. With one annual ring, the video data 21, the audio data 22A through 22D, the auxiliary AV data 23, and the realtime metadata 24 are divided into a predetermined time unit having a data size greater than one round of tracks such that these data correspond to reproduction time zones and arranged and recorded in the order of the divided reproduction time units, as shown in FIG. 2C for example. Each piece of the data forming the clip 20 is interleaved by annual ring structure in predetermined time unit to be recorded to the optical disc.

It should be noted that the data forming an annual ring is referred to as annual ring data. The annual ring data has a data amount that is an integral multiple of the minimum recording unit in disc. Each annual ring is recorded such that the boundary thereof matches the boundary of a block that is disc recording unit.

Figure 3:
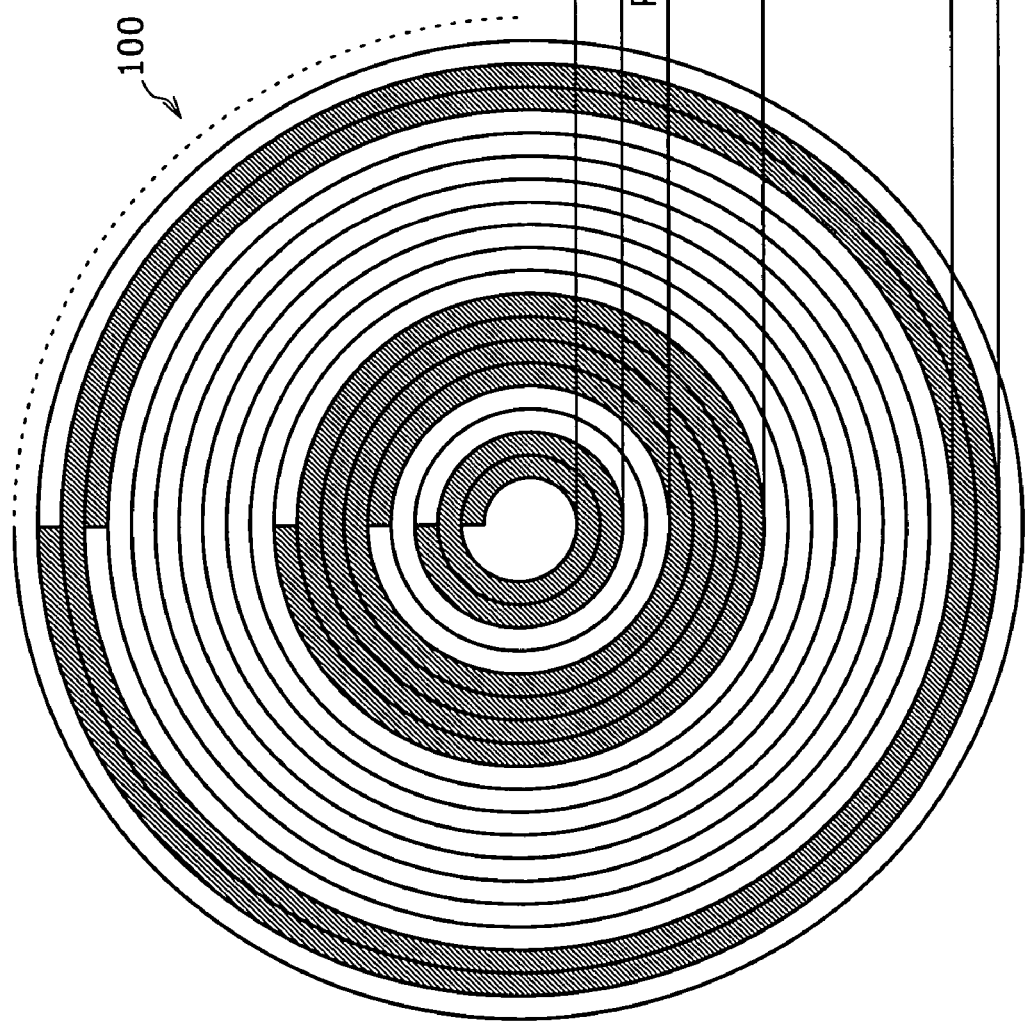
FIG. 3 is another schematic diagram illustrating an annual ring structure.

FIG. 3 shows an exemplary annual ring in which annual ring data is formed on the optical disc 100. In this example, from the inside towards the outside, auxiliary AV annual ring data #1, realtime meta annual ring data #1, audio annual ring data for channels #1, and video annual ring data #1 are recorded in this order, the annual ring data being handled in this cycle. On the external periphery of video annual ring data #1, a part of the annual ring data of a next cycle is recorded as auxiliary annual ring data #2.

The example shown in FIG. 3 is indicative that the reproduction time zone for one annual ring data of realtime meta annual ring data corresponds to the reproduction time zone for one annual ring data of auxiliary AV annual ring data and the reproduction time zone for one annual ring data of realtime meta annual ring data corresponds to the reproduction time zone for 2 cycles of audio annual ring data. Likewise, the reproduction time zone for one annual ring data of realtime meta annual ring data corresponds to the reproduction time zone of for four cycles of video annual ring data. This correlation between annual ring data reproduction time zones and cycles is set on the basis of the data rates of these annual ring data for example. In what follows, the reproduction time for one annual ring data is 2 seconds.

It should be noted that the header and the footer for each clip are also recorded in an annual ring structure as shown in FIG. 2D.

Figure 4:
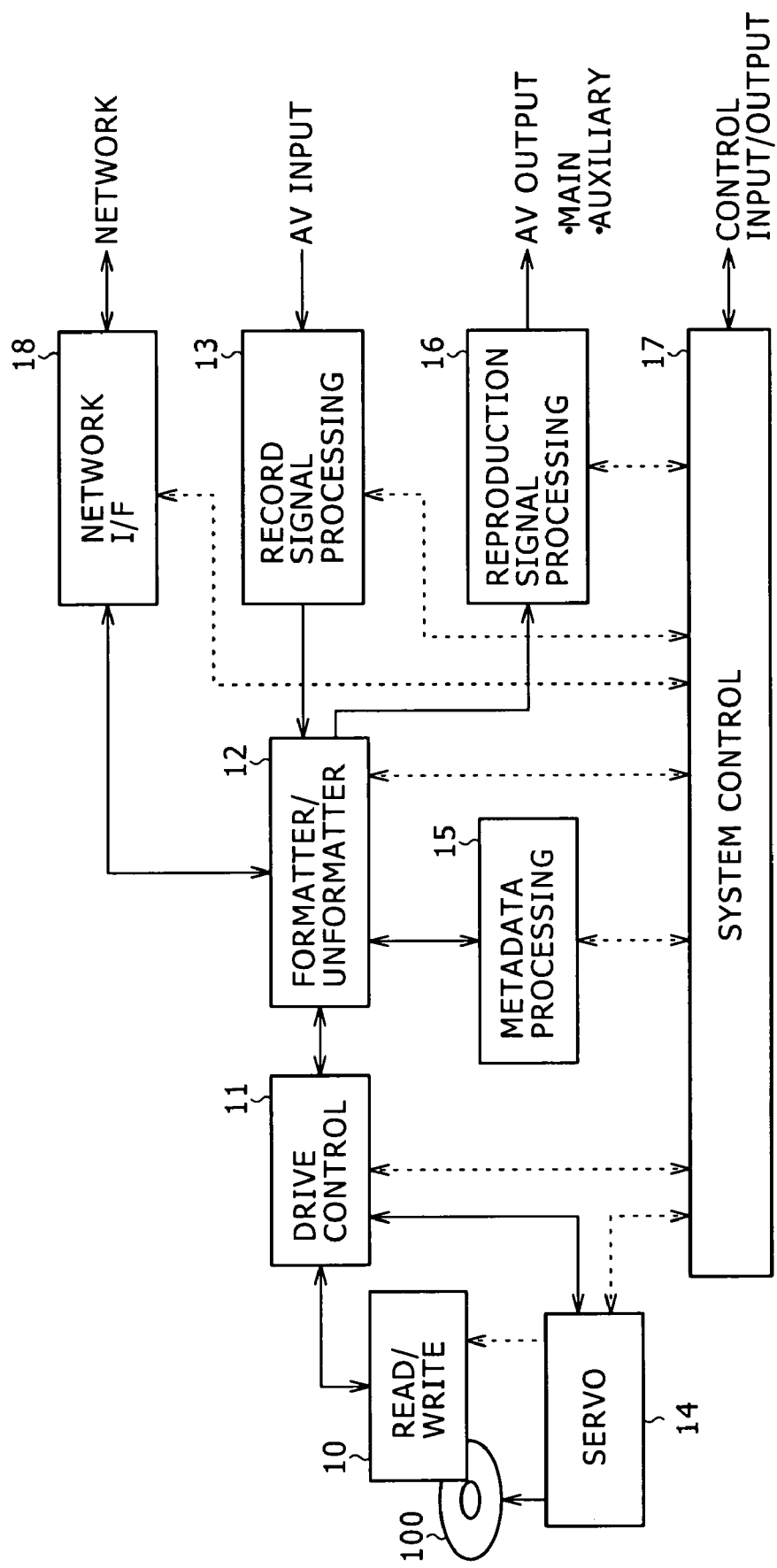
FIG. 4 is a block diagram illustrating an exemplary configuration of a recording and reproducing apparatus practiced as one embodiment of the invention.

FIG. 4 shows an exemplary configuration of the recording and reproducing apparatus practiced as one embodiment of the invention. This recording and reproducing apparatus, connected with a video camera for example, records AV data taken by the video camera onto the optical disc 100 through signal processing. The recording and reproducing apparatus also reproduces AV data recorded to the optical disc 100 and outputs the reproduction through predetermined signal processing. In addition, the recording and reproducing apparatus is capable of editing the AV data recorded to the optical disc 100 on the basis of instructions given through a control panel attached to the apparatus or an input device connected to the apparatus via an RS-422 interface, not shown.

A system control block 17 has one or more CPUs (Central Processing Units), a ROM (Read Only Memory) storing programs and data in advance, and a RAM (Random Access Memory) for use as a work memory for the CPU and controls the entire recording and reproducing apparatus as instructed by programs read from the ROM and in accordance with control signals entered through a control input/output terminal. The control input terminal is connected to the above-mentioned control panel or the above-mentioned input device via the RS-422 interface.

The following describes a configuration of a recording system of this apparatus. A recording operation command is given from the control input/output terminal to the system control block 17. On the basis of the received recording operation command, the system control block 17 issues a recording operation start command to the relevant components of the recording and reproducing apparatus.

For example, the baseband AV data to be recorded is supplied from the video camera or an external device to a record signal processing block 13. The record signal processing block 13 executes predetermined signal processing and data compression processing on the entered baseband AV data, thereby generating main-line AV data and auxiliary AV data to be recorded.

For example, the main-line video data is generated by configuring baseband video data such that one GOP (Group Of Picture) is formed by one frame and by data-compressing the baseband data by MPEG2 to provide a predetermined bit rate. Audio data is used as main-line audio data as is PCM (Pulse Code Modulation) data for example without data compression.

Also, the baseband video data and audio data are data-compressed at a bit rate of several Mbps by MPEG4 for example, thereby generating auxiliary AV data. In the auxiliary AV data, the video data is encoded with a predetermined number of frames as a unit. In the present embodiment, the video data in the auxiliary AV data is configured such that one I picture and nine P pictures, amounting to 10 frames, form one GOV (Group Of Video Object Plane).

The audio data in the auxiliary AV data is generated by instantaneously compressing the main-line audio data by combining sampling frequency conversion for compressing time axis direction and logarithmic compression for compressing word length, for example. Sampling frequency conversion down-samples the main-line audio data having a sampling frequency of 48 kHz to the audio data having a sampling frequency of 8 kHz. For word-length compression, A-Law scheme may be used in which compression is executed by setting a small quantization step when the amplitude of the data is small and a large quantization step when the amplitude of the data is large. Also, the tone quality degradation due to data compression may be minimized by previously limiting the band through a lowpass filter before executing compression. In the present embodiment, a 512-tap FIR (Finite Impulse Response) filter is used for the lowpass filter.

The main-line AV data and the auxiliary AV data outputted from the record signal processing block 13 are supplied to a formatter/unformatter 12. Each clip is formed by the main-line AV data and auxiliary AV data outputted from the record signal processing block 13 and the realtime metadata outputted from a metadata processing block 15 to be described later.

The metadata processing block 15 generates realtime metadata to be recorded to the optical disc 100 along with main-line AV data and auxiliary AV data and the data (header and footer) for adjusting each clip to a predetermined format, under the control of the system control block 17. The metadata processing block 15 also generates nonrealtime metadata. These pieces of data generated by the metadata processing block 15 are supplied to the formatter/unformatter 12.

The formatter/unformatter 12 arranges the data supplied from the record signal processing block 13 and the metadata processing block 15 into the above-mentioned annual ring structure. For example, the formatter/unformatter 12 has a memory in which the supplied data are stored at addresses corresponding to the annual ring structure. Then, the formatter/unformatter 12 executes read control so as to read data on an annual ring basis. Clips arranged in annual ring structure are supplied to a drive control block 11 on an annual ring basis.

At the time of recording, the drive control block 11 executes predetermined record signal processing on the supplied data and controls a read/write block 10 and a servo control block 14 on the basis of signals supplied from the read/write block 10 and the servo control block 14, thereby controlling a write operation such that record data is written to the read/write block 10 at predetermined addresses.

The main-line AV data, auxiliary AV data, realtime metadata, and header and footer supplied from the formatter/unformatter 12 to the drive control block 11 are error-corrected coding by a predetermined size ECC (Error Correction Coding) block basis. The error-corrected data are record-encoded in a predetermined manner into a record signal, which is then supplied to the read/write block 10.

The read/write block 10 has an optical pickup based on a laser diode for example and a laser drive circuit for controlling the laser power of the optical pickup in a predetermined manner in accordance with the operation mode of recording/reproduction. The read/write block 10 also has a sled drive block for controlling the position of the optical pickup relative to the radial direction of the optical disc 100, on the basis of a sled control signal supplied from the servo control block 14. The servo control block 14 controls the sled drive block and a spindle motor, not shown, for rotatively driving the optical disc 100 on the basis of control signals supplied from the drive control block 11 and the system control block 17.

The read/write block 10 drives the optical pickup on the basis of the record signal supplied from the drive control block 11, thereby executing a recording operation on the optical disc 100 on the basis of the record signal. A recording position at which the record signal is recorded is specified by the system control block 17 and the drive control block 11 on the basis of information indicative of an area use situation of the optical disc 100 and a command entered from the control input/output terminal on the basis of information of the file system FS read from the optical disc 100 before the recording operation.

It should be noted that, in the present embodiment, a recording operations for the optical disc 100 are executed continuously on an annual ring basis. Also, in the present embodiment, the block size that is the minimum recording unit of the optical disc 100 is the same as the ECC block size, thereby executing recording such that the minimum recording unit of the optical disc 100 matches the ECC block. In the present embodiment, the ECC block is the unit of record signal processing and, at the same time, the unit in which data is written on the optical disc 100.

Further, a marker block made up of a predetermined data sequence for one to several ECC blocks for example is recorded on an annual ring basis. This marker block is used to make reproducible the recorded data up to the immediately preceding annual ring if a recording error for example occurs during recording data for one annual ring. Therefore, every time the recording for one annual ring has been completed, the marker block for that annual ring becomes unnecessary.

The following describes an exemplary configuration of the reproduction system of the recording and reproducing apparatus. First, a reproducing operation command is given from the control input/output terminal to the system control block 17. On the basis of this reproducing operation command, the system control block 17 issues a reproduction start command to the relevant components of the recording and reproducing apparatus. The read/write block 10 is controlled in a predetermined manner, data being read, as a reproduction signal, from specified addresses in the optical disc 100 on a recording unit basis. The reproduction signal is then supplied from the read/write block 10 to the drive control block 11.

The drive control block 11 decodes the supplied reproduction signal into reproduction data and error-corrects the reproduction data. The error-corrected reproduction data is then supplied to the formatter/unformatter 12. The formatter/unformatter 12 separates the supplied reproduction data into data types such as main-line AV data, auxiliary AV data, and realtime metadata. For example, the supplied reproduction data is stored in the memory of the formatter/unformatter 12. When one annual ring of the reproduction data has been stored, the data forming the annual ring are read to be supplied to the relevant processing blocks. The main-line AV data and the auxiliary AV data are supplied to a reproduction signal processing block 16. The realtime metadata is supplied to the metadata processing block 15.

The metadata processing block 15 interprets the supplied realtime metadata and supplies the resultant information to the system control block 17.

The reproduction signal processing block 16 executes predetermined signal processing on the supplied main-line AV data and the supplied auxiliary AV data. For example, both or one of the main-line AV data and the auxiliary AV data is decoded. It should be noted that these data may be outputted in an encoded state. Because, with the video data of the auxiliary AV data, one GOV is formed by 10 frames, the video data is decoded on one GOV basis. The audio data is instantaneously decompressed in word length by the A-Law scheme and the down-sampled sampling frequency is up-sampled to 48 kHz. In the up-sampling, the same 512-tap FIR filter as that used at recording is used as a lowpass filter, thereby minimizing the degradation in tone quality.

A network interface (I/F) 18 is connected to a network such as the Internet or a LAN (Local Area Network) for example, thereby controlling communication made through a network. For example, the present recording and reproducing apparatus is capable of receiving AV data sent over a network and recording the received data to the optical disc 100.

For example, the AV data received by the network I/F 18 over a network is supplied to the formatter/unformatter 12. In this example, the AV data may be supplied from the network I/F 18 to the record signal processing block 13. Alternatively, the AV data may be supplied from the network I/F 18 directly to the drive control block 11. For example, upon reception of the AV data at the network I/F 18, the system control block 17 determines the type of the received AV data, accordingly executing record signal processing, the processing by the formatter/unformatter 12, or metadata processing. The processed AV data is supplied to the drive control block 11 to be processed in a predetermined manner, the resultant AV data being recorded to the optical disc 100.

The AV data and auxiliary AV data read from the optical disc 100 may be supplied to the network I/F 18 via the formatter/unformatter 12 to be transmitted to a network. In this case, because the auxiliary AV data is compressed at a low bit rate, the auxiliary AV data is preferably transmitted over a network.

The present recording and reproducing apparatus is capable of editing clips recorded to the optical disc 100. For example, by use of AV data supplied externally or AV data recorded to the optical disc 100, the recording and reproducing apparatus may edit other AV data recorded to the optical disc 100.

The following describes one embodiment of the present invention. In the present invention, clips recorded to random-accessible recording media such as the optical disc 100 for example are edited in a destructive manner. Destructive editing writes the data of a necessary portion over the base data subject to editing. In destructive editing, appropriate data of the base data is written over with edit data to be directly rewritten in accordance with the specification of edit points such as in-point and out-point and the edit mode such as insert editing or assemble editing. At this moment, the base data is not copied or moved to another area on the recording medium concerned. In what follows, the data to which edit points are set as the data subject to editing is referred to base record or base data and the data that is written to an area defined by edit points on the base data is referred to as edit data.

The following describes details of the embodiment with reference to FIGS. 5A and 5B. In the following example, insert editing is assumed in which clip #1 before editing be the base data, an object of editing be specified by setting an in-point and an out-point to clip #1, and a video cut be inserted between the in-point and the out-point as the edit data. In destructive editing, the edit data is directly written over the base data between the in-point and the out-point. Therefore, after editing, the data from the beginning of clip #1 to the in-point becomes the base data (the data of the original clip #1), the data from the in-point to the out-point becomes the edit data, and the data from the out-point to the end of clip #1 becomes the base data as shown in FIG. 5B for example.

It should be noted that, in destructive editing, header H#1 and footer F#1 are also rewritten along with the editing of the body of clip #1.

Thus, in destructive editing, the data outside the area subject to editing in base recording does not require rewriting, so that the time required for editing may only be minimal. In addition, because the edit data is written over the area subject to editing on the base, an unused area is not changed by editing. Therefore, an editing operation is always executable regardless of the size and segmentation degree of the unused area. Further, the data arrangement is not moved by editing in destructive editing, so that, if the clip based on base record (clip #1 in the example shown in FIG. 5A) is continuously reproducible, the editing result may also be guaranteed in continuous editing.

As described above, in the present invention, a nonlinear recording medium is used to execute destructive editing in which the edit data is written over the base data, so that no free space on the recording medium is required in the execution of editing. In addition, the amount of the data to be rewritten is minimized by destructive editing, so that the time necessary for rewriting in an editing operation is minimized. Further, because the edit data is written over the base data by destructive editing, a seek operation does not take longer in the reproduction of the result of editing than before editing. This advantage allows the execution of sophisticated editing.

FIGS. 6A to 6D show exemplary base data rewrite range in destructive editing as corresponding to the annual ring structure. FIGS. 6A to 6D correspond to FIGS. 2A to 2D, in which the rewrite range is indicated by hatched lines. FIG. 6A shows data forming clip #1 are indicated by time lines for clip #1. In this example, a pair of an in-point and an out-point are set in clip #1. In each of the files forming clip #1, the data defined by an in-point and an out-point provides a range that is rewritten by the edit data. For the data ranging from the beginning of clip #1 to the in-point, which is the outside of editing in clip #1, and the data ranging from the out-point to the end of clip #1, the data before editing are held, so that these data need not be changed in principle.

FIG. 6B is indicative of clip #1 shown in FIG. 6A in an annual ring structure. In the example shown in FIG. 6B, the body of clip #1 is recorded to annual ring #1 through annual ring #N and the header and footer of clip #1 are written to annual ring #H and annual ring #F respectively. Thus, from the viewpoint of annual ring structure, the in-point and out-point to be set to clip #1 do not always match annual ring boundaries. In the example shown in FIG. 6B, the in-point is set in annual ring #2 and the out-point in annual ring #4. In the present invention, data is formed by a plurality of files that are parallel to each other in time sequence and the files are interleaved approximately every 2 seconds by annual ring structure to be recorded to the optical disc 100. Hence, in an annual ring in which the in-point and the out-point are included, the range to be rewritten becomes scattered.

FIG. 6C shows a rewrite range by placing a focus on annual ring #2 in which the in-point is set. Thus, the position in which the reproduction position corresponds to the in-point for each data forming clip #1 becomes the start point of the rewrite range, thereby making the rewrite range scattered in the annual ring. Although not shown, the position corresponding to the out-point for each data forming clip #1 becomes the end point of the rewrite range, thereby making the rewrite range scattered in the annual ring.

At this moment, if the area outside the rewrite range is small enough for each piece of data in the annual ring, then the rewrite area and this area outside thereof may also be written over together. If this is done, the editing operation speed may be enhanced to some degree.

If a header and a footer are added to the body of a clip, editing may often require the rewriting of these header and footer. In destructive editing, these header and footer may also be written over the header and footer already recorded to the base record. If this is done, the unused area is not used for the header and footer. In the present embodiment, annual ring #H in which the header is written and annual ring #F in which the footer is written are updated by editing to be totally rewritten as shown in FIG. 6D for example.

In the present invention, the integrity of all data forming each clip is maintained for each set edit point. Therefore, the correlation between the main-line AV data and the auxiliary AV data may be maintained, thereby allowing a special reproducing operation on the basis of auxiliary data and an offline editing operation on the basis of auxiliary AV data also for edit results.

The following describes details of the processing that is executed in the proximity of the in-point and the out-point at the time of destructive editing. As described above, access to the optical disc 100 is made on a predetermined-sized block (the ECC block in this example), so that a rewrite range is also specified on a block basis. Therefore, any block having any data even partially subject to rewriting is made subject to rewriting in the entire block. Any block partially subject to rewriting must be replaced in only the data subject to writing while holding the contents of the base data in the data outside the rewrite range. For example, the data of that block read from the optical disc 100 is written to the memory where the data subject to rewriting is replaced to be written back to the optical disc 100 on a block basis (the processing will hereafter be referred to as read-modify-write processing).

To be more specific, the data rewrite range depends on the form of the data to be rewritten. For example, in the case of video signal format in which data compression is executed on the basis of the correlation between frames, it is difficult to rewrite only a given part of the data. Therefore, for the video data compressed between frames must be rewritten on the basis of a plurality of frames such as GOP and GOV that may be completed in decoding.

Cross fade processing is executed on audio data so as to suppress the occurrence of hop noise caused by connecting data in a discontinuous manner. In data rewriting, the signal processing time interval associated with this cross fade processing must be taken into consideration as the data rewrite range.

Further, for realtime metadata, the rewrite range is also specified on an ECC block basis.

In the present embodiment, auxiliary AV data is configured such that one GOV is formed by 10 frames for video data. Therefore, the video data of auxiliary AV data is processed such that an in-point or an out-point is set in a GOV; for the GOV including frames subject to rewriting and frames not subject to rewriting, the frames outside the edit range, namely the base data for example, are re-encoded by use of corresponding main-line video data frames to form a GOV again, which is written back to the recording medium. It should be noted that trans coding may also be executed in which frames are decoded once and then only subject frames are rewritten for re-encoding.

Figure 7A:
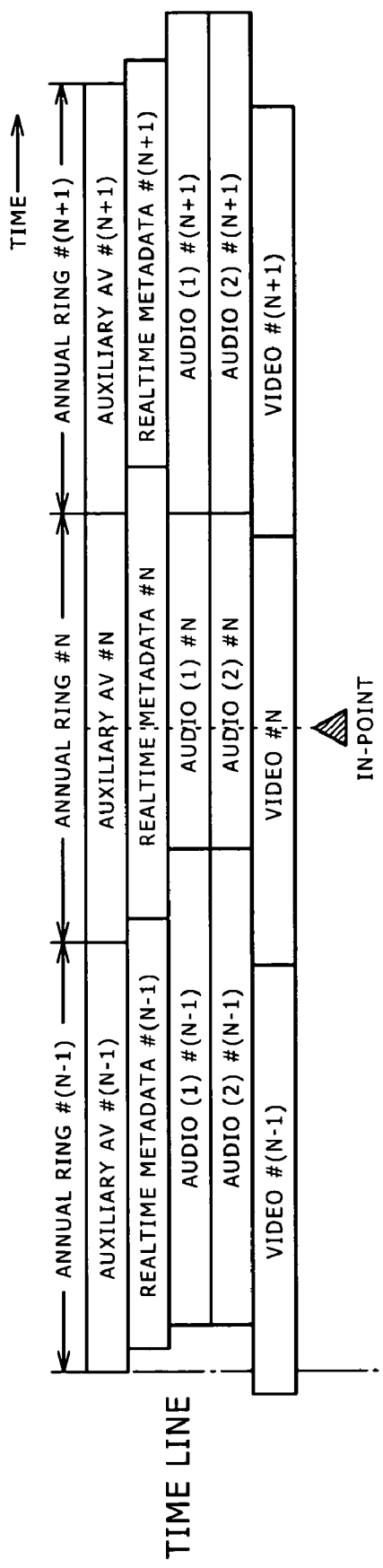
FIGS. 7A and 7B are schematic diagrams illustrating an example of a rewrite range with blocks taken into consideration.
Figure 7B:
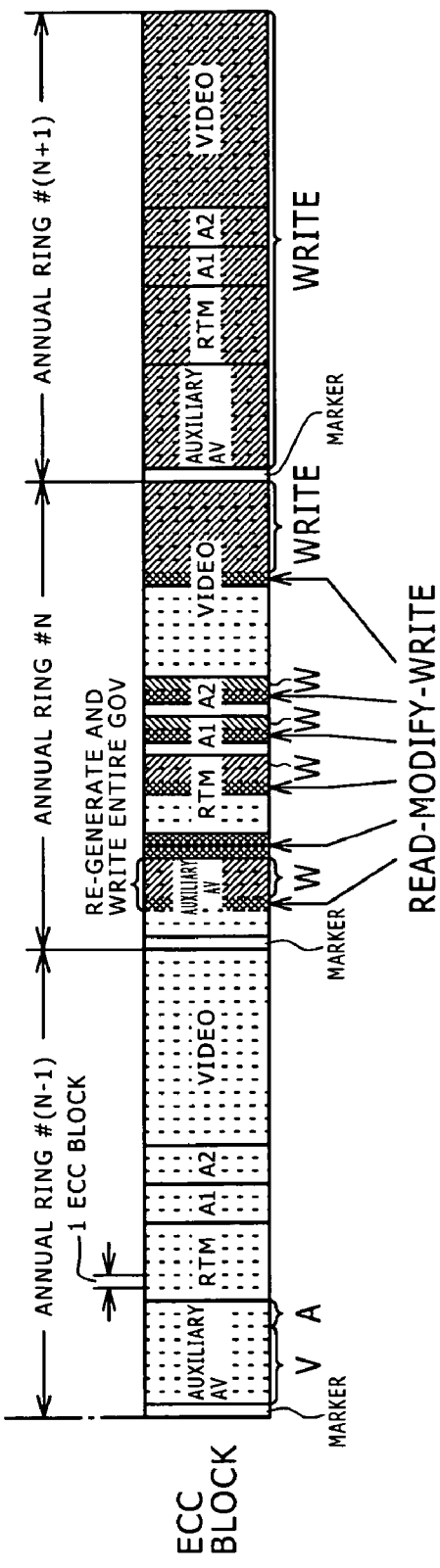

FIGS. 7A, 7B, 8A, and 8B show exemplary rewrite ranges with blocks taken into consideration. In these figures, in clip, the main-line audio data are of 2 lines; audio data (1) and audio data (2), for the brevity of description. FIGS. 7A and 7B show examples of an ECC block boundary and a rewrite range in the proximity of an in-point. FIG. 7A shows the proximity of an in-point set in a clip with clip time lines. FIG. 7B an example of an arrangement of data corresponding to FIG. 7A on a recording medium with focus placed on the ECC block.

As shown in the example of FIG. 7A, the data forming a clip do not always have a same reproduction time. With data having the same time, reproduction times are slightly different among annual rings. This is because the optical disc 100 does not allow recording and reproducing as a file unless access is made on the block boundary of recording unit; therefore, each piece of data is delimited at a position corresponding to the block boundary nearest to the reproduction time (2 seconds in this example) set as an annual ring.

At this moment, in the present embodiment, the auxiliary AV data is recorded with the block boundary matched with the beginning of the annual ring. For the main-line video data, if the boundary between the last video frame in an annual ring and the video frame following the last video frame do not match, the main-line video data is delimited at a position temporally going back from the beginning of the auxiliary data, thereby matching the annual ring boundary with the block boundary. Further, the main-line audio data and the realtime metadata are delimited at a position later than the position at which the main-line video data was delimited, thereby matching the annual ring boundary with the block boundary. It should be noted that the above-mentioned annual ring delimiting is only one example and therefore not restricted to the above-mentioned example.

FIG. 7B shows the recording of each piece of data on an ECC block basis in each annual ring. In this example, a marker block, auxiliary AV data, realtime metadata, main-line audio data (1), (2), and so on for the number of channels, and main-line video data are arranged in this order from the beginning of the annual ring. FIG. 7B also shows that one annual ring is recorded with 8 ECC blocks of auxiliary AV data, 6 ECC blocks of realtime metadata, 3 ECC blocks of each of main-line audio data, and 15 ECC blocks of main-line video data, for the brevity of description. It assumed in this example that, of the 8 ECC blocks of auxiliary AV data, 6 ECC blocks are used by video data and 2 ECC block are used by audio data.

The following describes details of data sizes of data in annual rings. The size of one ECC block is 64 kB (kilo bytes) for example. The innermost circumference of the optical disc 100 is covered by approximately 2 ECC blocks while the outermost circumference is covered by 5 ECC blocks. One piece of realtime metadata has a size of 5 to 6 ECC blocks. One piece of main-line audio data has a size of 2 to 6 ECC blocks for each channel. One piece of main-line video data has a size of 100 to 200 ECC blocks.

One piece of auxiliary AV data has a size of 8 ECC blocks. Of the 8 ECC blocks of auxiliary AV data, 2 ECC blocks form audio data and most of 6 ECC blocks form video data. These 6 ECC blocks include the metadata associated with auxiliary AV data. In the present embodiment in which one annual ring is 2 seconds, one ECC block of video data is the data equivalent to 10 frames, thereby forming a GOV.

The sizes of these data depend on encoding methods used. It should be noted that, in the present embodiment, a marker block is allocated with one ECC block for example.

Here, assume a case in which an in-point be specified approximately at the center of annual ring #N as shown in FIG. 7A, for example. the rewrite portion of each piece of data forming a clip is controlled on an ECC block basis. Referring to FIG. 7B, the ECC blocks in annual ring #(N−1) before the in-point are not subject to rewriting. The ECC blocks in annual ring #(N+1) after the in-point are subject to rewriting. On the other hand, in annual ring #N including the in-point, the auxiliary AV data and other data are different in rewrite range.

The following describes details of the rewrite range of annual ring #N including the in-point. Read-modify-write processing is executed on the data other than the auxiliary AV data, namely the main-line video data, the main-line audio data, and realtime metadata for the ECC blocks including the in-point, the data subsequent to the in-point in the ECC block concerned is rewritten with the edit data, and the data before the in-point remains as the base data before editing. Then, the ECC blocks subsequent to the ECC block including the in-point in annual ring #N are rewritten with the edit data and the ECC blocks before the ECC block including the in-point are not subject to rewriting.

On the other hand, of the auxiliary AV data in annual ring #N including the in-point, the frames subsequent to the in-point in the GOV concerned in the video data are replaced with the edit data and, for the frames before the in-point, the frames corresponding to the main-line video data are used. These frames are encoded again to create a GOV again. Then, the base is rewritten by the ECC block that includes the created GOV.

As described above, in the present embodiment, one GOV corresponds to one ECC block in the video data of the auxiliary AV data. In this case, the processing is complete within that ECC block. If one GOV having the in-point extends over a plurality of ECC blocks, the processing is executed on each of these ECC blocks. If one GOV extends to adjacent annual ring #(N+1) or annual ring #(N−1), the above-mentioned processing is executed on all ECC blocks associated with this extending one GOV.

On the other hand, of the auxiliary AV data in annual ring #N including the in-point, 2 ECC blocks are used for the audio data in the present embodiment. As described above, the number of channels is fixed to 8 for the audio data of the auxiliary AV data, so that one ECC blocks includes 4 channels of audio data. Therefore, with the audio data in the auxiliary AV data included in annual ring #N in which an in-point is set, the ECC block portion in which a channel to be edited is included is rewritten. In rewriting the audio data of the auxiliary AV data, the audio data concerned is decoded, the data subsequent to the in-point of each channel is replaced by the edit data by executing read-modify-write processing, and the data before the in-point is held unchanged. The 8 channels of the audio data thus processed are data-compressed in a predetermined manner to be written to the optical disc 100.

It is also practicable to generate the audio data of the auxiliary AV data from the edited main-line audio data for example to write the generated audio data to the optical disc 100.

It should be noted that, in each ECC block to be rewritten, the error correction code is decoded before rewriting and the error-corrected data is rewritten by the edit data. The data rewritten by the edit data is error-correction coded again to form an ECC block. This ECC block is written back to the optical disc 100.

FIGS. 8A and 8B show examples of an ECC block boundary and a rewrite range in the proximity of the out-point. It is assumed here that the out-point is set in annual ring #N. In this case, as with the in-point described with reference to FIGS. 7A and 7B, read-modify-write processing is also executed on the ECC block including the out-point for the main-line video data, the main-line audio data, and the realtime metadata, the data before the out-point of that ECC block is rewritten by the edit data, and the data subsequent to the out-point of that ECC block is left as the base data before editing (refer to FIG. 8B). Then, the ECC blocks before the ECC block including the out-point in annual ring #N are rewritten by the edit data and the ECC blocks subsequent to the ECC block including the out-point are not subject to rewriting.

With respect to the auxiliary AV data, as with the case of the in-point described with reference to FIGS. 7A and 7B, the video data before the out-point in the auxiliary AV data in annual ring #N including the out-point is replaced by the edit data and, for the data subsequent to the out-point, the frames corresponding to the main-line video data are used. These frames are encoded again to generate a GOV. The base is rewritten by the ECC blocks including the generated GOV.

The same processing as with the in-point applies to the audio data in the auxiliary AV data. With the audio data in the auxiliary AV data included in annual ring #N in which the out-point is set, the ECC block portion in which a channel to be edited is included is rewritten. Like the above-mentioned rewrite processing, the audio data concerned is decoded, the data before the out-point of each channel is replaced by the edit data by executing read-modify-write processing, and the data subsequent to the out-point is held unchanged. The 8 channels of the audio data thus processed are data-compressed in a predetermined manner to be written back to the optical disc 100.

It should be noted that, with reference to FIGS. 7A to 8B, the description was made such that the in-point exists in the same annual ring in each piece of data forming a clip, for the sake of description. Actually, however, as shown in FIGS. 7A and 8A, plural pieces of data forming a clip may be different in reproduction time in one annual ring, so that, if an in-point is specified in the proximity of the annual ring boundary for example, the in-point may possibly be included in different annual rings in the plural pieces of data forming the clip. In this case, the rewrite range in the proximity of the in-point is also determined on an ECC block basis in the same manner as described above.

Thus, because a range in which data is rewritten is obtained for each record unit of each recording medium in the present invention, it is practicable to execute editing on block devices.

The following describes rewrite processing unique to audio data. in the editing of audio data, cross fade processing and V mute processing are executed before connecting the base audio data with the audio data based on the edit data by edit processing, thereby suppressing the occurrence of pop noise for example. At this moment, an audio data rewrite range must be determined by taking these cross fade processing and V mute processing into consideration. It should be noted that cross fade processing and V mute processing are generally the same in function, so that only cross fade processing will be described below.

Figure 9:
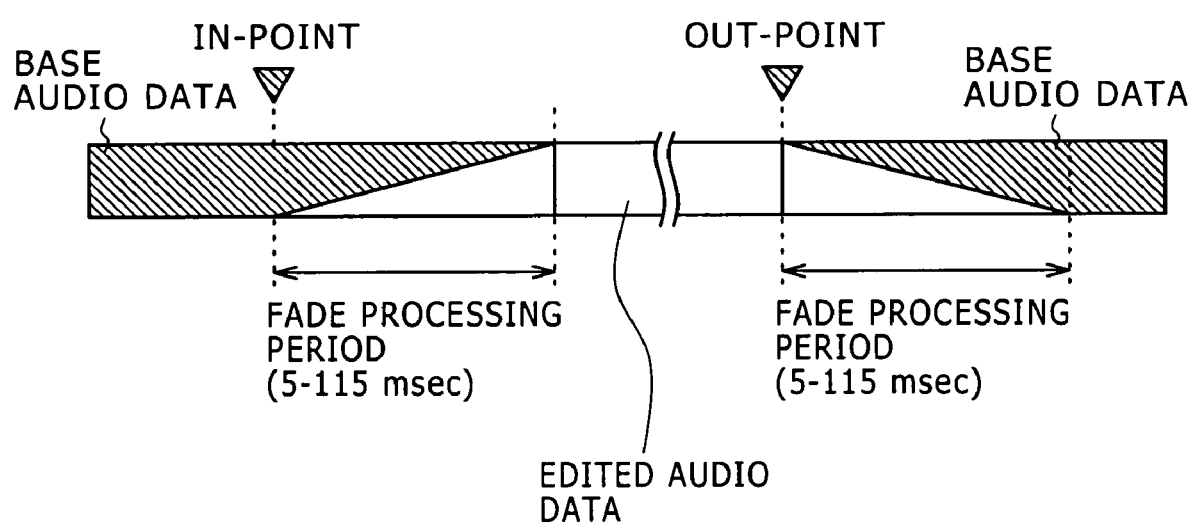
FIG. 9 is a schematic diagram illustrating an overview of the processing of cross fading of audio data.

Referring to FIG. 9, cross fade processing to be executed on audio data, applicable to the present embodiment, will be described in an overview manner. On the in-point side, cross fade processing is executed for a predetermined period from the in-point for example. As shown in FIG. 9 for example, cross fade processing is executed on the basis of an arithmetic operation in which the level of the base audio data is gradually lowered during a predetermined period from the in-point the level of the edit audio level is gradually increased accordingly, thereby executing a mixture such that the level ratio between the base audio data and the edit audio data gradually changes. The cross fade operation on the in-point side is executed for a period 5 ms to 115 ms for example from the in-point. On the out-point side, cross fade processing is also executed for a predetermined period from the out-point. The cross fade processing on the out-point is also executed for 5 ms to 115 ms for example from the out-point.

Thus, at the editing of audio data, predetermined periods relative to the set in-point and out-point are affected by the signal processing based on cross fade processing. Especially, subsequent to the out-point, cross fade processing is executed outside the range subject to editing, thereby changing the base data. Therefore, the range that is affected by this cross fade processing must also be taken into consideration as a rewrite range.

First, the cross fade processing of main-line audio data will be described. As described above, it is assumed that the main-line audio data be PCM data that is not data-compressed.

For example, on the out-point side, ECC blocks that include a period to be affected by cross fade processing are obtained. In the example shown in FIG. 8B, audio data A1 and A2 of main-line are each made up of 3 ECC blocks, the first ECC block being a range subject to rewriting, the center ECC block being a range subject to rewriting by read-modify-write processing, and the end ECC block being a range not subject to rewriting. As long as the period affected by cross fade processing remains inside the center ECC block, cross fade processing is executed in that ECC block by read-modify-write processing, the rewrite ranges for the first and last ECC blocks remaining unchanged. If the period affected by cross fade processing extends over to the last ECC block, the last ECC block is subject to the rewriting by read-modify-write processing and the first and last ECC blocks are subject to rewriting.

It should be noted that, in the present embodiment, the cross fade period is in the range subject to edit on the in-point side as described above, it is not especially necessary to consider the influence to the rewrite range by cross fade processing.

The following describes the case of the audio data of auxiliary AV data. As described above, the audio data of auxiliary AV data is data-compressed by use of down-sampling and word-length compression. In addition, before the compression, the band is limited by use of a 512-tap lowpass filter. At the time of decompression, the same 512-tap lowpass filter as used at compression is used in up sampling. Therefore, it is necessary to determine each range subject to rewriting by taking the processing with the low-pass filter into consideration.

Referring to FIGS. 10A and 10B, in the case where a 512-tap FIR filter is used, with attention placed on a particular sample, samples are entered in the filter starting with 512 samples before the sample of attention, a filtering result reflected on the samples starting with 256 samples before. On the in-point side, filter processing for the samples of the in-point starts with 512 samples before the in-point, thereby starting the updating of the sample data by the filter processing 256 samples before the in-point, as shown in FIG. 10A for example. Therefore, with the in-point, the front end of the rewrite range must be set 256 samples before the in-point in accordance with the number of filter taps.

It should be noted that, as with the above-mentioned case of the audio data of main-line, the cross fade processing is executed inside the range subject to editing in the present embodiment, so that the influence to this range by the cross fade processing need not especially taken into consideration.

On the out-point side, a cross fade period starts with the out-point and the filter processing for the end sample by the cross fade processing is executed up to 512 samples after that sample, thereby updating the sampling data up to the 256 samples after that sample, as shown in FIG. 10B. Therefore, with the out-point, the end side of the range subject to rewriting must be set 256 samples after the sample at which the cross fade processing has ended by considering the cross fade period from the out-point and in accordance with the number of filter taps.

As described with reference to FIGS. 7A to 8B, for the audio data of auxiliary AV data, that of the auxiliary audio data included in annual ring #N with an in-point or an out-point set are all rewritten. Therefore, on the in-point side, if the sample located 256 samples before the in-point is included in the annual ring #N including that in-point, the range subject to rewriting by the auxiliary AV data signal processing is only the audio data of the auxiliary AV data in that annual ring #N. The updating of the sample data by the filter processing is executed by read-modify-write processing.

On the other hand, if the sample located 256 samples before the in-point extends on the audio data of the auxiliary AV data included in annual ring #(N−1) immediately before annual ring #N including that in-point, the ECC block portion of the audio data of the auxiliary AV data included in that annual ring #(N−1) is subject to rewriting, the ECC block portion including a channel subject to editing.

The same holds with the out-point side. On the out-point side, if the cross fade processing has ended on the out-point and the 256th sample from the sample on which the cross fade processing has ended is included in annual ring #N having that out-point, then the range subject to rewriting in the signal processing of the auxiliary AV data is only the audio data of the auxiliary AV data in that annual ring #N. The updating of the sample data by the filter processing is executed by read-modify-write processing.

On the other hand, if the further 256th sample from the sample at which the cross fade processing of the out-point extends over annual ring #(N+1) immediately after the auxiliary AV data included in that annual ring #(N+1), then the ECC block portion of the audio data of the auxiliary AV data included in that annual ring #(N+1) is subject to rewriting, the ECC block portion including a channel subject to editing.

It should be noted another method may also be used in which cross fade processing does not start from the in-point on the in-point side and from the out-point on the out-point side. For example, a method may be possible in which the in-point and the out-point come approximately to the middle point of cross fade processing. In this case, the period in which signal processing is affected by cross fade processing is taken into consideration as a period subject to rewriting. In the example shown in FIG. 9, a period from the beginning of cross fading to the in-point is considered as the period subject to rewriting.

The following describes the case of the video data of auxiliary AV data. As described above, in the present embodiment, one GOV is made up of 10 frames in the video data of the auxiliary AV data and the data-compression and data-decompression processing is executed on a one GOV basis. Therefore, the range subject to rewriting on the basis of in-point and/or out-point must be determined by taking GOV into consideration.

Figures 11A, 11B:
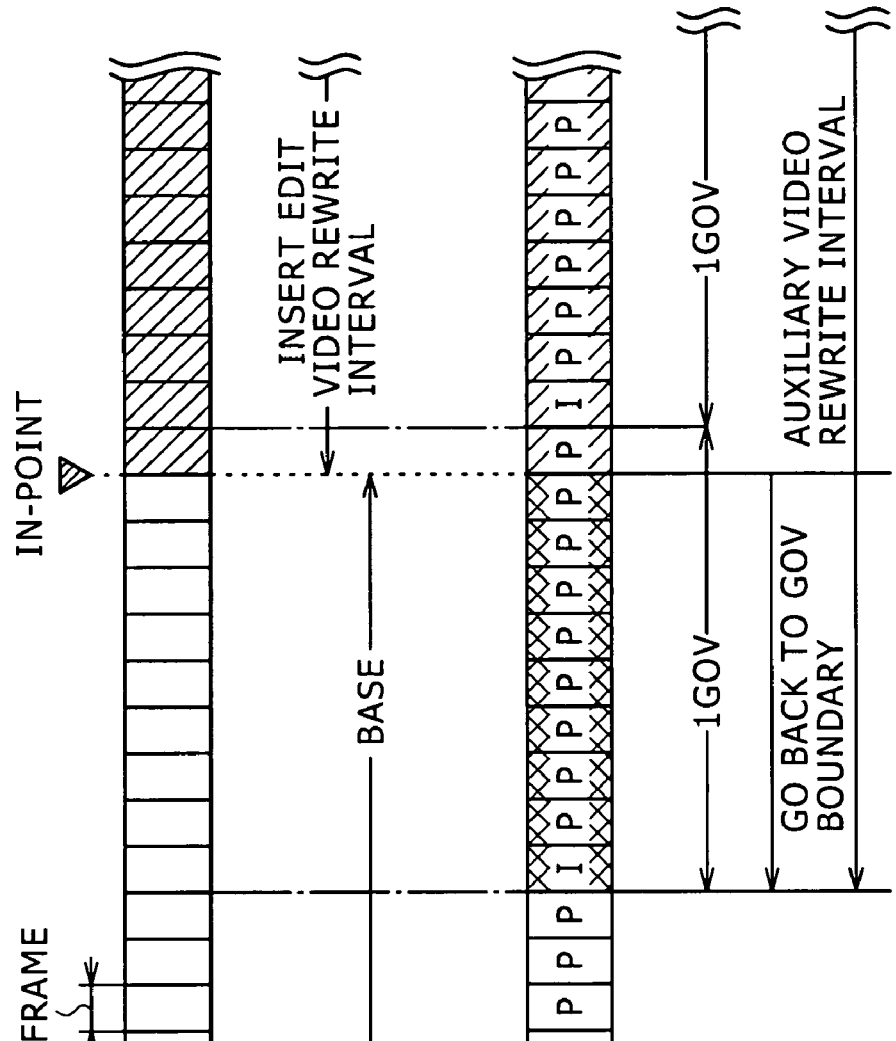
FIGS. 11A and 11B are schematic diagrams illustrating a rewrite range in video data of auxiliary AV data.

Referring to FIGS. 11A and 11B, in the present embodiment, the main-line video data may be edited on one frame basis as shown in FIG. 11A. In the main-line video data, the frames subsequent to the in-point are subject to rewriting by editing. On the other hand, with the video data of the auxiliary AV data, one GOV is made up of 10 frames each composed of one I picture and 9 P pictures. The video data of the auxiliary AV data may be accessed only on a GOV basis.

It is assumed that the set in-point be in the GOV (in this example, the 9th frame from the beginning of the GOV) in the video data as shown in FIG. 11B. Because the video data of the auxiliary AV data can be recorded and reproduced only on a GOV basis, the edit point in GOV must be edited by use of the main-line video data, thereby executing data-compression processing again. The data compression is executed such that the GOV after editing is formed by the frames of main-line video data corresponding to the frames from the beginning of the original GOV to the in-point in the video data of the auxiliary AV data and the frames of the edit data corresponding to the frames from the in-point to the end of the original GOV in the video data of the auxiliary AV data. Therefore, the entire GOV is included in the range subject to rewriting on the basis of the in-point. The processing on the out-point side is executed in generally the same manner as that on the in-point side.

Thus, with the main-line audio data and the audio data and video data of the auxiliary AV data, the rewrite ranges extend outside the actual edit range. For example, with the video data of the auxiliary AV data, the rewrite range goes back to the GOV boundary on the in-point side and advances to the GOV boundary on the out-point side. In the present invention, the data rewrite range is obtained by considering the rewrite range that extends outside the GOV boundary also in this case, so that the data in the proximity of the in-point and the out-point may have an appropriate state at the execution of editing processing, thereby resulting in the smooth reproduction of editing results.

Figure 12:
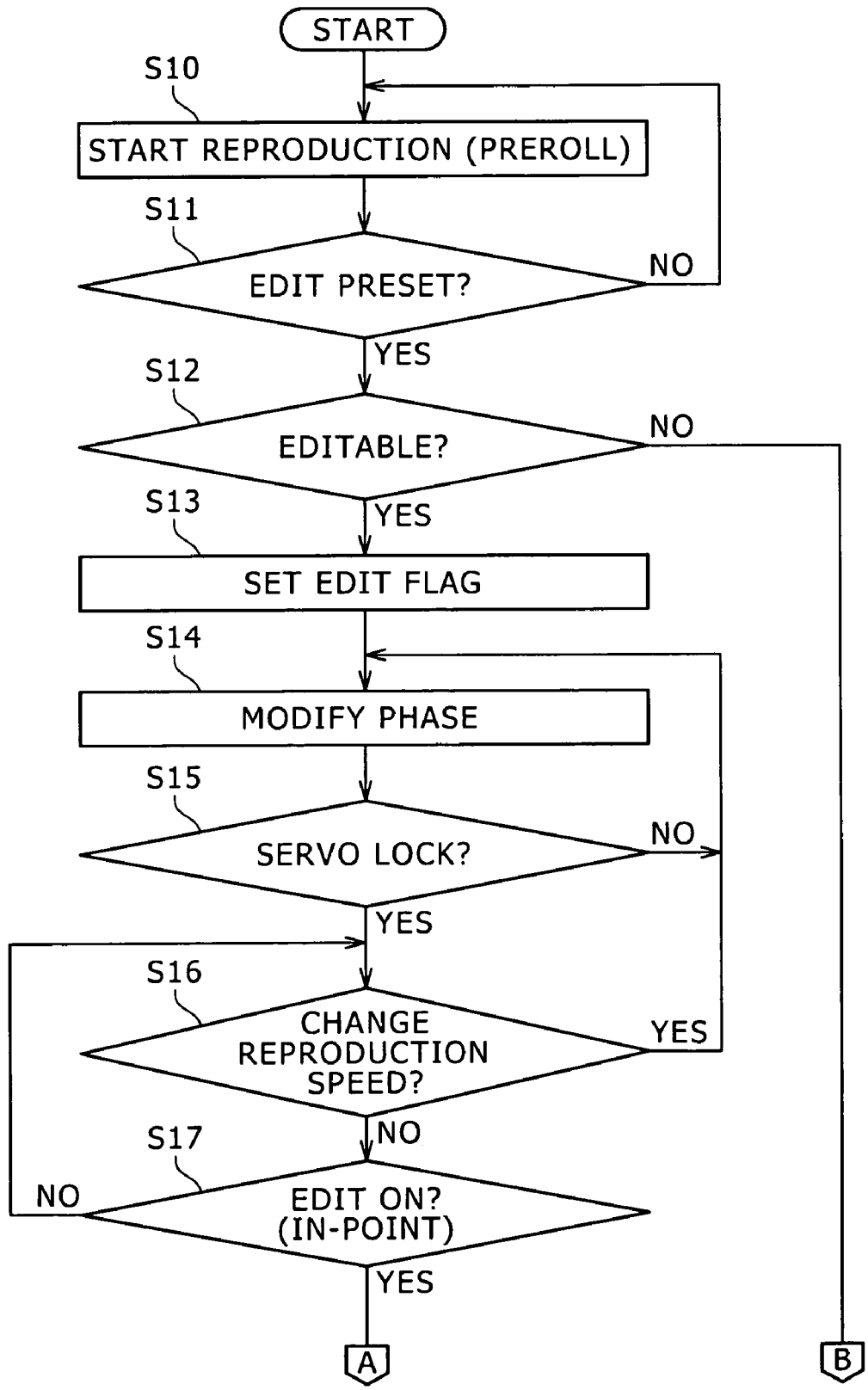
FIG. 12 is a flowchart indicative of an exemplary editing operation practiced as one embodiment of the invention.
Figure 13:
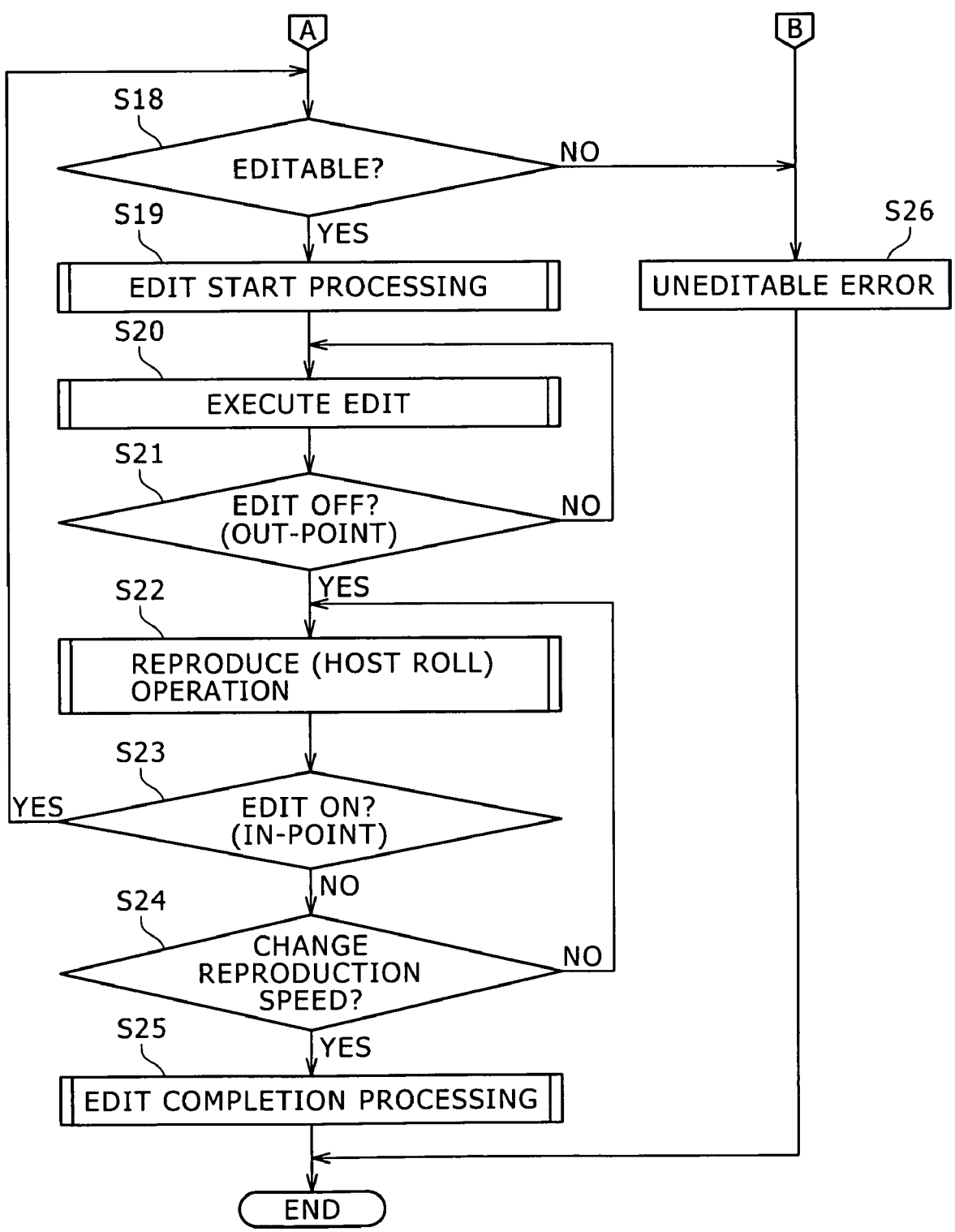
FIG. 13 is a flowchart continued from the flowchart shown in FIG. 12.

The following describes an editing operation that may be practiced as one embodiment of the invention with reference to flowcharts shown in FIGS. 12 and 13. It should be noted that reference A and reference B are indicative that the procedures move from A and B in FIG. 12 to A and B in FIG. 13.

It should be noted that, in the processing shown in FIGS. 12 and 13, decisions and execution commands are made by the system control block 17 described with reference to FIG. 4 for example. It is assumed that the specification of actual in-point and out-point and the instruction of reproduction start and end be executed by so-called 9-pin control in which these processing operations are executed by use of a recording and reproducing apparatus and an edit operation block connected thereto via an RS-422 interface. The system control block 17 controls the components of the recording and reproducing apparatus in accordance with various control signals supplied from this edit operation block.

Referring to FIG. 12, it is assumed that the operation start point have been returned a certain period before from the in-point, with cueing to the pre-roll start point completed. In step S10, a reproducing operation (or a pre-roll operation) starts from the pre-roll start point. Next, on the basis of an edit preset signal indicative of a type of data to be edited supplied from the edit operation block, a decision is made whether a subject of editing has been specified (step S11). If s subject of editing is found not specified, the procedure returns to step S10. If the subject to editing is found specified, the procedure goes to step S12, in which a decision is made whether an editing operation is enabled or not. If an editing operation is found enabled, the procedure goes to step S13, in which an edit flag is set on the recording and reproducing apparatus in response to edit preset.

On the other hand, if the execution of an edit operation is found disabled for some reason, such as that the recording and reproducing apparatus concerned is incompatible with the edit operation itself for example, the processing goes to step S26, in which error handling is executed for the inability of editing.

When the edit flag is set in step S13, then, a phase modifying operation is executed in steps S14 through S16. A phase modifying operation is executed to adjust the video data of editing source and the video data of editing destination into a predetermined phase relationship by use of a frame pulse for example. The phase modifying operation controls the phases of the video data of the editing source and destination on a frame basis. In step S15, a decision is made whether or not the phase modifying operation has been completed to execute servo lock operation. If the phase adjusting operation has not been completed and therefore no servo lock is set, then the procedure returns to step S14. If the servo lock is found set in step S15, then the procedure goes to step S16, in which decision is made whether or not reproduction speed change has been specified. If reproduction speed change is found specified, such as stop, fast forward feed, fast backward feed, forward slow play, or backward slow play for example, the procedure returns to step S14. If there is no reproduction speed change, it is determined that the phase modifying operation has been completed, upon which the procedure goes to step S17.

In step S17, an edit-on signal for specifying an edit start point (or an in-point) supplied from the edit operation block is put in a standby state. When this edit-on signal has reached the edit start point (or the in-point) in timing, this edit-on signal causes the recording and reproducing apparatus to start an actual editing operation. In step S18 (refer to FIG. 13), a decision is made whether or not the editing is enabled. If the editing is found disabled for some reason, then the procedure goes to step S26, in which error handling is executed for the inability of the editing. If the editing is found enabled, then the procedure goes to step S19, in which the processing necessary for starting an actual editing operation is executed.

When the processing in step S19 has been completed, then the actual editing operation is executed in step S20. The editing operation is executed continuously until an edit-off signal indicative of an edit end point (or an out-point) is received from the edit operation block (step S21).

When the edit-off signal has been received and the editing operation ends, the procedure goes to step S22, in which a post-roll operation is executed to continuously reproduce the AV data of the edit destination subsequent to the out-point.

It may happen that an edit-on signal is received during a post-roll operation and another in-point is specified. In step S23, a decision is made whether or not an edit-on signal has been received during the post call operation. If an edit-on signal is found received, then the procedure returns to step S18, in which an editing operation based on the received edit-on signal is executed.

On the other hand, if an edit-on signal is found not received in step S23, then the procedure goes to step S24, in which a decision is made whether or not there has occurred a reproduction speed change. If a reproduction speed change is found, such as stop, fast forward feed, fast backward feed, forward slow play, or backward slow play for example, it is determined that the editing operation has been completed, upon which the procedure goes to step S25, in which editing completion processing is executed. If no reproduction speed change is found in step S24, then the procedure returns to step S22 to continue the post-roll operation.

Figure 14:
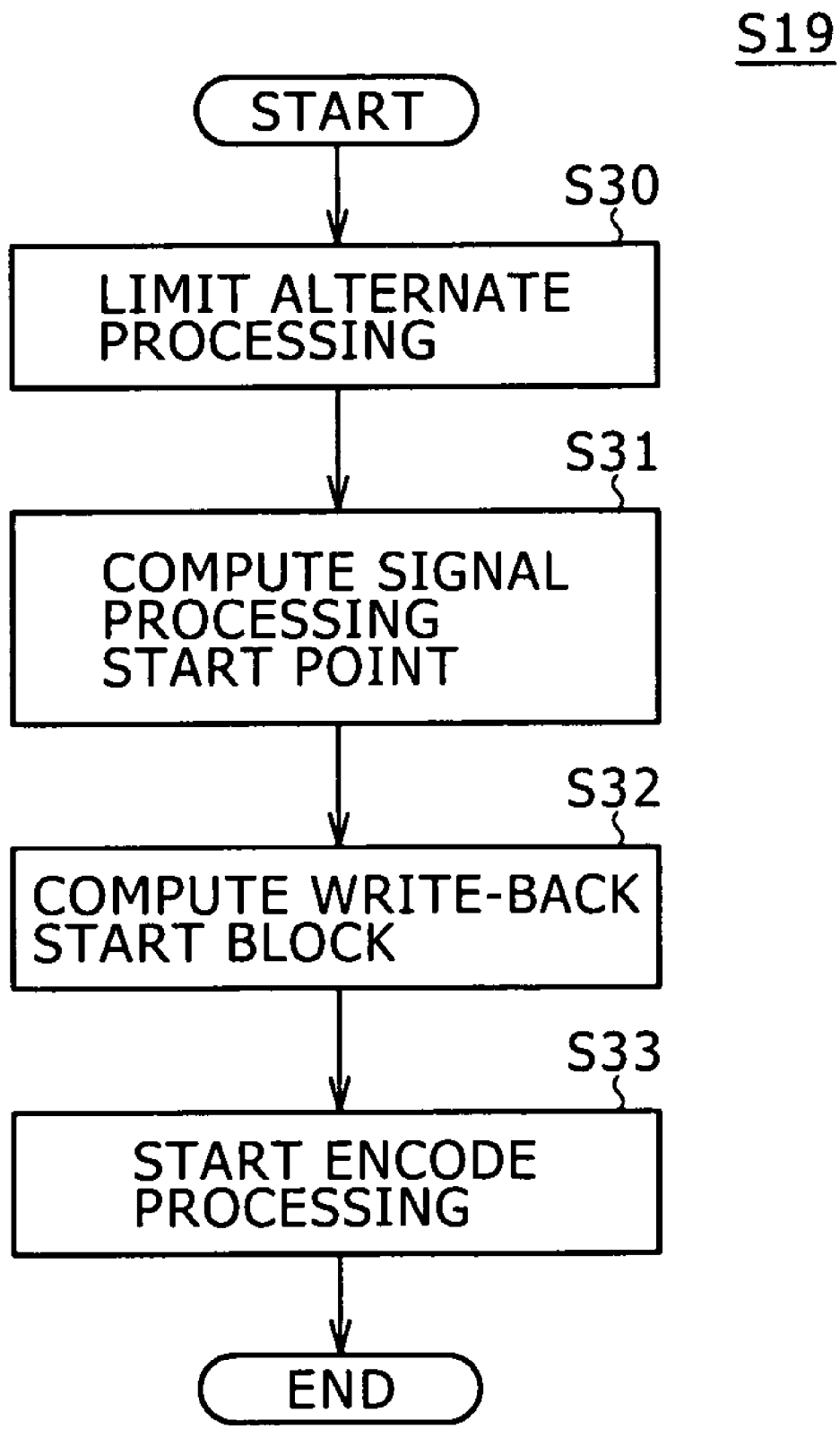
FIG. 14 is a flowchart indicative of details of exemplary editing start processing.

FIG. 14 shows details of the exemplary editing start processing described above with reference to FIGS. 19A and 19B. In step S30, limitations to alternation processing are set. For example, alternation processing itself may be disabled or alternation processing may be executed by use of a predetermined area other than an alternate area set to the recording medium in advance, such as a marker block described above for example. In step S30, any of these processing operations for alternation processing is executed as required.

In step S31, the start point at which the signal processing starts is computed. In step S32 a block with which writing the edited data back to the recording medium starts is computed. For example, as described with reference to FIGS. 7A through 11B, if a rewrite range extends outside an actual edit range by the signal processing in the case of the main-line video data and audio data and the video data and audio data of the auxiliary AV data, the range subject to rewriting and the signal processing start point indicative of a time at which an actual signal processing operation starts are computed in these steps S31 and 32.

In step S33, the AV data of the edit source and edit destination are encoded on the basis of the processing results obtained in steps S30 through S32. Incidentally, the processing order of steps S30 through S32 is not limited in the order described above.

Figure 15:
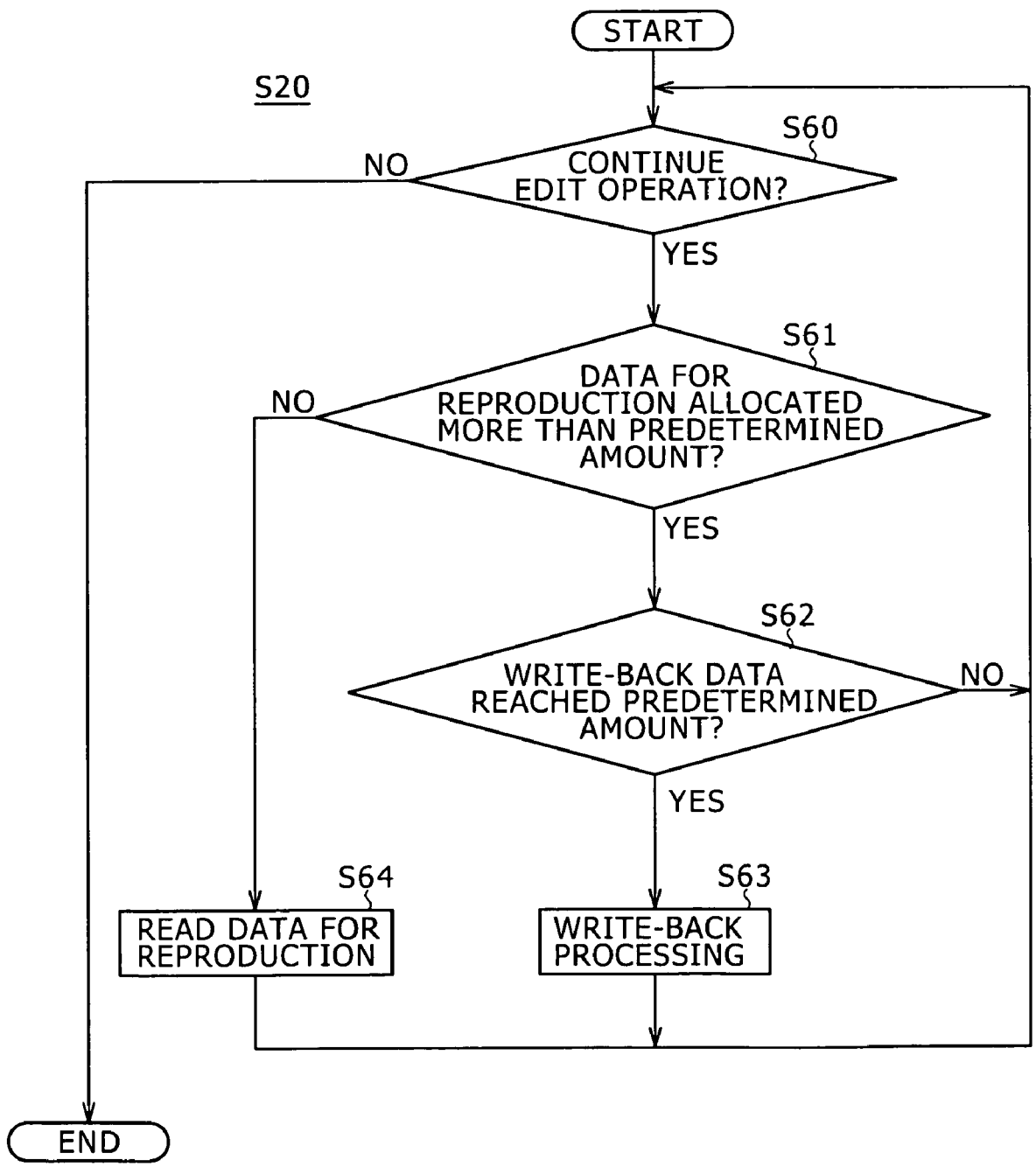
FIG. 15 is a flowchart indicative of details of exemplary editing execution processing.

FIG. 15 shows details of an example of the edit processing executed in step S20. Of the edit execution processing, FIG. 15 mainly shows the processing associated with the access to recording medium. At the same time as this edit execution processing shown in FIG. 15, the processing for decoding and coding the AV data is executed. Before describing the edit execution processing, the use of a buffer memory in the case where recording and reproduction are executed at a time will be overviewed for ease of understanding.

If the AV data of edit source and the AV data of edit destination are recorded on one optical disc 100 and an editing operation is completed on the optical disc 100, the reading and reproduction of the AV data from the optical disc 100 and the writing back of the AV data to the optical disc 100 are executed concurrently in record units. For example, the AV data is read faster than the reproduction time of the AV data of record unit to be stored in the buffer. The AV data thus stored in the buffer is read at a decoding speed to be reproduced. In order to prevent a buffer underflow from occurring, the data read speed from the optical disc 100 and the AV data read speed from the buffer are controlled to predetermined levels.

The writing back of the AV data is executed after the AV data of record unit has been stored in the buffer.

Referring to FIG. 15, a decision is made in step S60 whether or not the editing operation is to be continued. If the editing operation is to be continued, the procedure goes to step S61. In step S61, a decision is made whether or not the data for reproduction has been stored in the buffer by a predetermined amount. If the amount of the AV data stored in the buffer is found below a predetermined level, then the procedure goes to step S64, in which the data for reproduction is readout to be stored in the buffer.

On the other hand, if the data for reproduction is found stored in the buffer higher than a predetermined level, the procedure goes to step S62. In step S62, a decision is made whether or not the amount of the write-back data stored in the buffer has reached a predetermined level. If the amount is found gone up to a predetermined level, then the procedure goes to step S63, in which the AV data stored in the buffer is written back to the optical disc 100. On the other hand, if the amount of the write-back data is found below a predetermined level, then the procedure returns to step S60.

Figure 16:
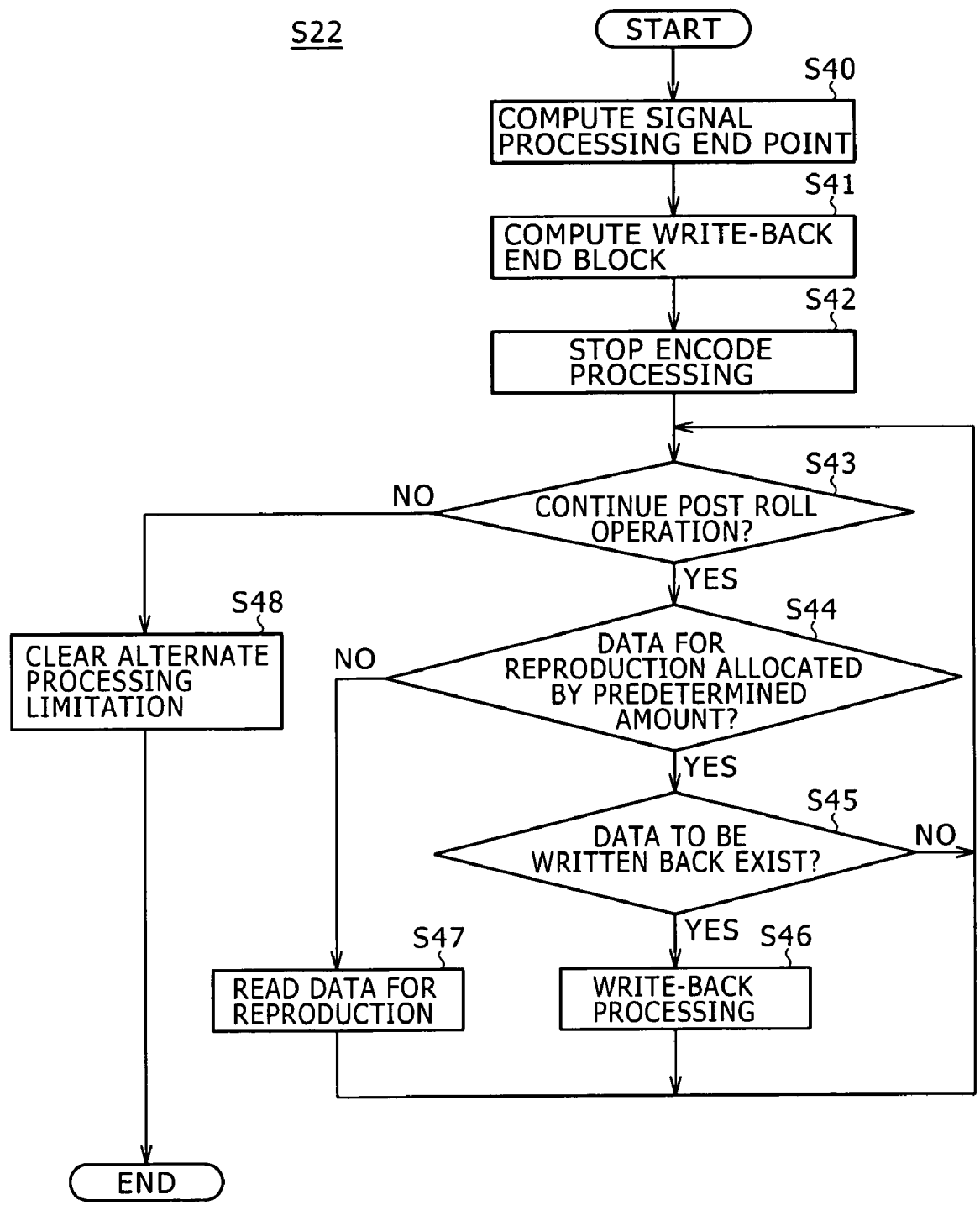
FIG. 16 is a flowchart indicative of details of an exemplary post roll operation.

FIG. 16 shows, in detail, exemplary post-roll processing of step S22 described above. Among the post-roll operations, FIG. 16 mainly describes the processing associated with the access to recording medium. Concurrently with the post-roll processing shown in FIG. 16, the decoding and encoding of the AV data involved in the reproduction by the post-roll processing are executed.

First, in step S14, an end point at which the signal processing ends is computed in the same manner as the computation of the signal processing start point in step 31 in the edit processing start processing described with reference to FIG. 14. In step S41, a block with the writing of edited data back to recording medium ends is computed in the same manner as step S32 shown in FIG. 14. In step S42, encoding processing is stopped. It should be noted that the processing of step S42 may be skipped.

In step S43, a decision is made whether the post-roll processing is to be continued or not. If the post-roll processing is not to be continued, then the procedure goes to step S48, in which the limitations set to the alteration processing made in step S30 are cleared, upon which the post-roll processing ends. On the other hand, if the post-roll processing is to be continued, the procedure goes to step S44, in which a decision is made whether or not the amount of the data for reproduction stored in the buffer has reached a predetermined level in the same manner as with the edit processing described with reference to FIG. 15. If the amount of the AV data stored in the buffer is found below a predetermined level, then the procedure goes to step S47, in which the data for reproduction is readout to be stored in the buffer.

On the other hand, if the amount of the data for reproduction is found stored higher than a predetermined level, the procedure goes to step S45. In step S45, a decision is made whether there is any data to be written back to recording medium. For example, if there is found any data to be written back, such as that the data to be edited has not all been written back, the procedure goes to step S46, in which the data concerned is written back to recording medium. If there is no data to be written back, the procedure returns to step S43.

It should be noted that, of the processing operations described with reference to FIGS. 12 and 13, the decisions whether an edit-on signal has been received in step S23 and a decision whether there is a reproduction speed change in step S24 are actually the processing operations that may be executed concurrently with the post-roll operation described with reference to FIG. 16. For example, if presence or absence of an edit-on signal or a reproduction speed change is found during post-roll processing, resulting in the reception of an edit-on signal or the detection of a reproduction speed change, the data read/write processing and the encoding and decoding processing in the post-roll processing are ended in a predetermined manner; if an edit-on signal is received, the procedure returns to step S18 and a reproduction speed change is detected, the procedure goes to step S25.

Figure 17:
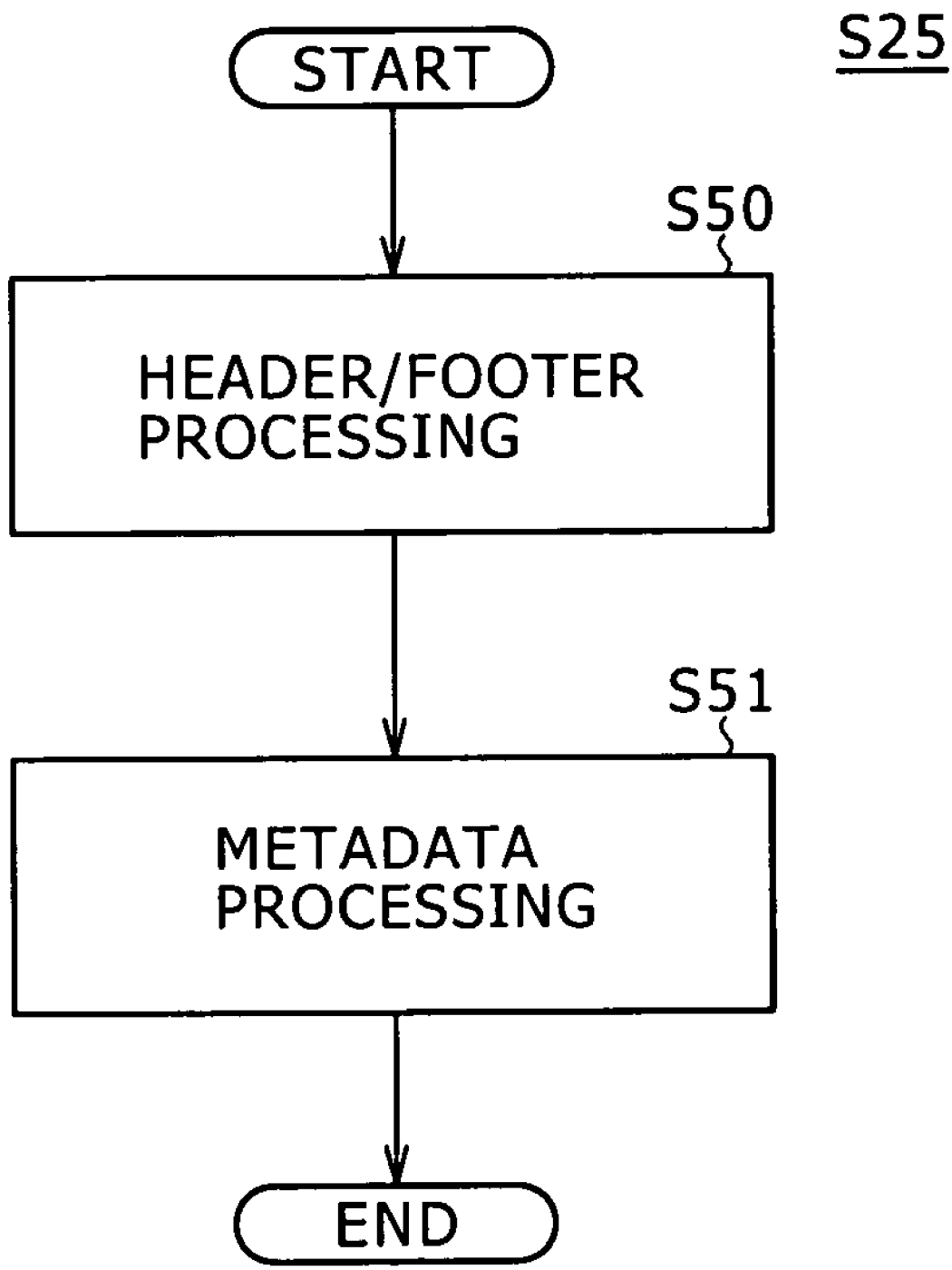
FIG. 17 is a flowchart indicative of details of exemplary editing completion processing.

FIG. 17 shows, in detail, an exemplary editing completion processing of step S25 described above. As a result of the edit processing, the information about header and footer is updated and editing results are reflected onto the header and the footer. In step S50, this processing on the header and the footer is executed, the updated header and footer being written back to recording medium. In step S51, the processing associated with metadata is executed. For example, the non-realtime metadata generated by the metadata processing block 15 is written to the NRT area of recording medium.

It should be noted that, in the above-mentioned description, the optical disc 100 is used as an recording medium applicable hereto, but not exclusively. The destructive editing according to the invention and the method of controlling the data rewrite range in the destructive editing may also be practicable with other types of disc recording media such as hard discs. Not only the disc-type recording media, but also nonlinear recording media such as semiconductor memories may be applicable to the invention as long as random access is enabled in unit of blocks having a predetermined size.

It should be noted that, in the above-mentioned description, clip recording is executed on an annual ring basis, but not exclusively. For example, the destructive editing according to the invention and the method of controlling data rewrite range in the destructive editing may also be applicable to other configurations in which clips are recorded in arrangements other than annual rings.

While preferred embodiments of the present invention have been described using specific terms, such description is for illustrative purpose only, and it is to be understood that changes and variations may be made without departing from the spirit or scope of the following claims.

In the drawings:

[FIG. 1]
LOGICAL ADDRESS SPACE
ALTERNATE AREA, NRT AREA, CLIP #1 BODY, CLIP #2 BODY, UNUSED AREA

[FIG. 2A]
TIME LINE OF CLIP #1
VIDEO
AUDIO (1)-(4)
AUXILIARY AV
REALTIME METADATA

[FIG. 2B]
ANNUAL RING #1-#H

[FIG. 2C]
VIDEO

[FIG. 2D]
FOOTER GROUP, HEADER GROUP

[FIG. 3]
100: OPTICAL DISC
AUXILIARY AV ANNUAL RING DATA #1
REALTIME META ANNUAL RING DATA #1
AUDIO (FOR CHANNELS) ANNUAL RING DATA #1
VIDEO ANNUAL RING DATA #1
AUXILIARY AV ANNUAL RING DATA #2

[FIG. 4]
10: READ/WRITE
14: SERVO

11: DRIVE CONTROL
12: FORMATTER/UNFORMATTER
15: METADATA PROCESSING
17: SYSTEM CONTROL⇔CONTROL INPUT/OUTPUT
18: NETWORK I/F⇔NETWORK
13: RECORD SIGNAL PROCESSING←AV INPUT
16: REPRODUCTION SIGNAL PROCESSING→AV OUTPUT, -MAIN, -AUXILIARY

[FIG. 5A]
BEFORE EDIT
LOGICAL ADDRESS SPACE
ALTERNATE AREA, NRT AREA, CLIP #1 BODY, CLIP #2 BODY, UNUSED AREA
SUBJECT TO EDIT (INSERT EDIT)

[FIG. 5B]
AFTER EDIT
ALTERNATE AREA, NRT AREA, CLIP #1 BODY, CLIP #2 BODY, UNUSED AREA
 OVERWRITE PORTION SUBJECT TO EDIT
 REWRITE HEADER AND FOOTER
NO CHANGE AFTER EDIT

[FIG. 6A]
IN-POINT, OUT-POINT
TIME LINE OF CLIP #1
VIDEO
AUDIO (1)-(4)
AUXILIARY AV
REALTIME METADATA

[FIG. 6B]
ANNUAL RING #1-(H)

[FIG. 6C]
VIDEO
PORTION SUBJECT TO REWRITE

[FIG. 6D]
FOOTER GROUP, HEADER GROUP

[FIG. 7A]
TIME LINE
TIME
ANNUAL RING #(N−1)-#(N+1)
AUXILIARY AV #(N−1)-#(N+1)
REALTIME METADATA #(N−1)-#(N+1)
AUDIO (1)#(N−1)-#(N+1)
AUDIO (2)#(N−1)-#(N+1)
VIDEO #(N−1)-#(N+1)
IN-POINT

[FIG. 7B]
ECC BLOCK
ANNUAL RING #(N−1)-#(N+1)
1 ECC BLOCK, RE-GENERATE AND WRITE ENTIRE GOV
AUXILIARY AV, VIDEO, AUXILIARY AV, VIDEO, AUXILIARY AV, VIDEO
MARKER

[FIG. 8A]
TIME LINE
TIME
ANNUAL RING #(N−1)-#(N+1)
AUXILIARY AV #(N−1)-#(N+1)
REALTIME METADATA #(N−1)-#(N+1)
AUDIO (1)#(N−1)-#(N+1)
AUDIO (2)#(N−1)-#(N+1)
VIDEO #(N−1)-#(N+1)
OUT-POINT

[FIG. 8B]
ECC BLOCK
ANNUAL RING #(N−1)-#(N+1)
1 ECC BLOCK, RE-GENERATE AND WRITE ENTIRE GOV
AUXILIARY AV, VIDEO, AUXILIARY AV, VIDEO, AUXILIARY AV, VIDEO
MARKER

[FIG. 9]
BASE AUDIO DATA, IN POINT, OUT POINT, BASE AUDIO DATA
FADE PROCESSING PERIOD (5-115 msec)
EDITED AUDIO DATA
FADE PROCESSING PERIOD (5-115 msec)

[FIG. 10A]
IN POINT
256 SAMPLES (48 kHZ), 256 SAMPLES (48 kHZ), CROSS FADE
AUXILIARY AUDIO DATA UPDATE
AUXILIARY AUDIO FILTER PROCESSING

[FIG. 10B]
OUT POINT
CROSS FADE, 256 SAMPLES (48 kHZ), 256 SAMPLES (48 kHZ)
AUXILIARY AUDIO DATA UPDATE
AUXILIARY AUDIO FILTER PROCESSING

[FIG. 11A]
MAIN VIDEO
1 FRAME, IN-POINT
BASE, INSERT EDIT, VIDEO REWRITE INTERVAL

[FIG. 11B]
AUXILIARY VIDEO
GO BACK TO GOV BOUNDARY
AUXILIARY VIDEO REWRITE INTERVAL

[FIG. 12]
S10: START REPRODUCTION (PREROLL)
S11: EDIT PRESET?
S12: EDITABLE?
S13: SET EDIT FLAG
S14: MODIFY PHASE
S15: SERVO LOCK?
S16: CHANGE REPRODUCTION SPEED?
S17: EDIT ON? (IN-POINT)

[FIG. 13]
S18: EDITABLE?
S19: EDIT START PROCESSING
S20: EXECUTE EDIT
S21: EDIT OFF? (OUT-POINT)
S22: REPRODUCE (HOST ROLL) OPERATION
S23: EDIT ON? (IN-POINT)
S24: CHANGE REPRODUCTION SPEED?
S25: EDIT COMPLETION PROCESSING
S26: UNEDITABLE ERROR

[FIG. 14]
S30: LIMIT ALTERNATE PROCESSING
S31: COMPUTE SIGNAL PROCESSING START POINT
S32: COMPUTE WRITE-BACK START BLOCK
S32: START ENCODE PROCESSING

[FIG. 15]
S60: CONTINUE EDIT OPERATION?
S61: DATA FOR REPRODUCTION ALLOCATED MORE THAN PREDETERMINED AMOUNT?
S62: WRITE-BACK DATA REACHED PREDETERMINED AMOUNT?

S63: WRITE-BACK PROCESSING
S64: READ DATA FOR REPRODUCTION

[FIG. 16]
S40: COMPUTE SIGNAL PROCESSING END POINT
S41: COMPUTE WRITE-BACK END BLOCK
S42: STOP ENCODE PROCESSING
S43: CONTINUE POST ROLL OPERATION?
S44: DATA FOR REPRODUCTION ALLOCATED BY PREDETERMINED AMOUNT?
S45: DATA TO BE WRITTEN BACK EXIST?
S46: WRITE-BACK PROCESSING
S47: READ DATA FOR REPRODUCTION
S48: CLEAR ALTERNATE PROCESSING LIMITATION

[FIG. 17]
S50 HEADER/FOOTER PROCESSING
S51 METADATA PROCESSING

[FIG. 18A]
LOGICAL ADDRESS SPACE
ALTERNATE AREA, NRT AREA, CLIP #1 BODY, CLIP #2 BODY, UNUSED AREA
SUBJECT TO EDIT (INSERT EDIT)

[FIG. 18B]
ALTERNATE AREA, NRT AREA, CLIP #1 BODY, CLIP #2 BODY
CLIP #3 BODY, UNUSED AREA
LEAVE ORIGINAL CLIP
NEWLY CREATE CLIP AFTER EDIT

[FIG. 19A]
LOGICAL ADDRESS SPACE
ALTERNATE AREA, NRT AREA, CLIP #1 BODY, CLIP #2 BODY
UNUSED AREA
SUBJECT TO EDIT (INSERT EDIT)

[FIG. 19B]
NEWLY CREATE PORTION SUBJECT TO EDIT AS SEPARATE FILE
ALTERNATE AREA, NRT AREA, CLIP #1 BODY, CLIP #2 BODY, UNUSED AREA
SEEK

What is claimed is:

1. A recording and reproducing apparatus for recording and reproducing any of video data, audio data, and realtime metadata corresponding to any of said video data and said audio data by use of a random-accessible recording medium,
wherein said recording and reproducing apparatus executes destructive editing on any of video data, audio data, and realtime metadata corresponding to any of said video data and said audio data recorded on said random-accessible recording medium on said recording medium,
wherein the destructive editing maintains a same sequence of data recorded on the random-accessible recording medium as that before the destructive editing, and
wherein the recording and reproducing apparatus executes the same destructive editing even when no free space is available on the random-accessible recording medium.

2. The recording and reproducing apparatus according to claim 1,
wherein said destructive editing is executed by recording at least first video data and another piece of data corresponding to said first video data in reproduction time onto said recording medium and said destructive editing is executed by applying a specified edit point commonly to said first video data and said another piece of data.

3. The recording and reproducing apparatus according to claim 2,
wherein said another piece of data, based on said first video data, is second video data generated with a transmission rate lower than that of said first video data.

4. The recording and reproducing apparatus according to claim 1,
wherein at least one of a header and a footer is recorded to any of said video data, said audio data, and said realtime metadata corresponding to any of said video data and said audio data, and according to a result of said destructive editing executed on any of said video data, said audio data, and said realtime metadata corresponding to any of said video data and said audio data, at least one of said header and said footer is written over any of said data.

5. The recording and reproducing apparatus according to claim 1,
wherein said recording medium is accessible in unit of block having a predetermined size and said data recorded on said recording medium is rewritten by said destructive editing in said unit of block.

6. The recording and reproducing apparatus according to claim 5,
wherein a signal processing unit of any of said video data and said audio data is matched with said size of said block.

7. The recording and reproducing apparatus according to claim 5,
wherein, on the basis of a specified edit start point and a specified edit end point, said destructive editing rewrites data between said specified edit start point and said specified edit end point by edit data in said block unit.

8. The recording and reproducing apparatus according to claim 7,
wherein said block including said edit start point and said edit end point is stored in memory on a block basis, only a portion of said block subject to said editing is rewritten by said edit data in said memory, and said edited block is written back to said recording medium on a block basis.

9. A recording and reproducing apparatus for recording and reproducing any of video data, audio data, and realtime metadata corresponding to any of said video data and said audio data by use of a random-accessible recording medium,
wherein said recording and reproducing apparatus executes destructive editing on any of video data, audio data, and realtime metadata corresponding to any of said video data and said audio data recorded on said random-accessible recording medium on said recording medium, and
wherein said destructive editing rewrites data outside an edit range on a specified edit start point and a specified edit end point.

10. The recording and reproducing apparatus according to claim 9,
wherein video data in which a subject to editing forms an access unit with a plurality of frames and, if any of said edit start point and said edit end point is located in said access unit, said video data is rewritten as including the entirety of said access unit.

11. The recording and reproducing apparatus according to claim 9,
wherein a subject to editing is audio data and data outside said edit range including a predetermined computation processing period at any of said edit start point and said edit end point is rewritten.

12. The recording and reproducing apparatus according to claim 11,
wherein said predetermined computation processing is cross fade processing.

13. The recording and reproducing apparatus according to claim 11,
wherein said predetermined computation processing is filter processing.

14. An editing method for editing any of video data, audio data, and realtime metadata corresponding any of said video data and said audio data recorded on a random-accessible recording medium,
wherein destructive editing is executed on any of said video data, said audio data, and said realtime metadata corresponding to any of said video data and said audio data recorded on said random-accessible recording medium on said recording medium,
wherein the destructive editing maintains a same sequence of data recorded on the random-accessible recording medium as that before the destructive editing, and
wherein the recording and reproducing apparatus executes the same destructive editing even when no free space is available on the random-accessible recording medium.

* * * * *

UNITED STATES PATENT AND TRADEMARK OFFICE
CERTIFICATE OF CORRECTION

PATENT NO. : 7,609,938 B2
APPLICATION NO. : 11/243400
DATED : October 27, 2009
INVENTOR(S) : Ando et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1058 days.

Signed and Sealed this

Twelfth Day of October, 2010

David J. Kappos
*Director of the United States Patent and Trademark Office*